United States Patent [19]
Bessho et al.

[11] Patent Number: 5,977,530
[45] Date of Patent: Nov. 2, 1999

[54] SWITCHING POWER SUPPLY FOR HIGH FREQUENCY HEATING APPARATUS

[75] Inventors: Daisuke Bessho; Kenji Yasui; Yoshiaki Ishio, all of Nara; Haruo Suenaga, Katano; Hideki Omori, Akashi; Makoto Mihara, Nara; Kazuho Sakamoto, Kyoto, all of Japan

[73] Assignee: Matsushita Electric Industrial Co., Ltd, Osaka, Japan

[21] Appl. No.: 09/030,611

[22] Filed: Feb. 25, 1998

[30] Foreign Application Priority Data

| Feb. 25, 1997 | [JP] | Japan | 9-040428 |
| Feb. 25, 1997 | [JP] | Japan | 9-040429 |
| Jun. 27, 1997 | [JP] | Japan | 9-171404 |
| Sep. 10, 1997 | [JP] | Japan | 9-245065 |
| Sep. 10, 1997 | [JP] | Japan | 9-245066 |
| Nov. 7, 1997 | [JP] | Japan | 9-305431 |

[51] Int. Cl.$^6$ .................................................. H05B 6/66
[52] U.S. Cl. ........................................................ 219/715
[58] Field of Search .................................... 219/715, 716, 219/721, 757; 363/17, 98, 49, 97

[56] References Cited

U.S. PATENT DOCUMENTS

| 4,931,609 | 6/1990 | Aoki | 219/716 |
| 5,012,058 | 4/1991 | Smith | 219/716 |
| 5,124,518 | 6/1992 | Lee . | |
| 5,171,949 | 12/1992 | Fujishima et al. | 219/716 |
| 5,354,972 | 10/1994 | Han | 219/715 |

FOREIGN PATENT DOCUMENTS

| 474 312 A1 | 9/1991 | European Pat. Off. . |
| 610 158 A1 | 2/1994 | European Pat. Off. . |
| 05199768 | 11/1991 | Japan . |

OTHER PUBLICATIONS

International Search Report for Int'l Appln No. PCT/JP98/00751 dated Feb. 25, 1998.

S.W. Wagner, "Stromversorgung eletronischer Schaltungen und Geräte", 1964, R.V. Decker's Verlag G. Schenk, Hamburg XP002064845, p. 279, paragraph 5—p. 299.

*Primary Examiner*—Tu Ba Hoang
*Assistant Examiner*—Jeffrey Pwu
*Attorney, Agent, or Firm*—Ratner & Prestia

[57] ABSTRACT

A switching device is employed in a power supply for driving a magnetron with lower withstand voltage and better controllability. A high frequency heating apparatus comprises a power supply, a leakage transformer connected to the power supply, a first switching device connected in series to a primary coil side of the leakage transformer, a first capacitor, a series circuit of a second capacitor and a second switching device, a driving circuit having an oscillator for driving the first switching device and the second switching device, a rectifier connected to a secondary coil side of the leakage transformer, and a magnetron connected to the rectifier. With this configuration, voltage applied to the first switching device can be clamped, and at the same time, the OFF time can be freely adjustable by the effect of the second capacitor and the second semiconductor switching device.

19 Claims, 22 Drawing Sheets

SWITCHING POWER SUPPLY FOR HIGH FREQUENCY HEATING APPARATUS

FIELD OF THE INVENTION

The present invention relates to the field of high frequency heating equipment and more specifically to dielectric heating employing a magnetron such as for microwave ovens. In particular, to circuit configurations of power supply units for driving a magnetron are disclosed.

BACKGROUND OF THE INVENTION

Power supply units are installed in a range of appliances including high frequency heating equipments for home use. Existing power supply units are generally heavy and large, and there is an increasing demand for smaller and lighter versions. Accordingly, development of smaller, lighter, and more inexpensive power supply units using a switching power supply are now being actively studied for use in a wide range of fields. There is also a demand for smaller and lighter power supply units for driving the magnetron in high frequency heating equipment for cooking food using magnetron-generated microwaves.

A switching power supply converts AC power or DC power to AC power with different frequency and voltage or DC power with different voltage. This is accomplished using semiconductor switching devices such as transistors and thyristors. In other words, the switching power supply is used for electric power conversion. Since the switching power supply operates semiconductor switching devices at high frequency, the reduction of switching loss is of key technological importance. In particular, switching power supply units used in high frequency heating equipment for home use may convert electric power at rates of above 1 kW. Reduction of switching loss is also important with respect to energy conversion.

A resonance circuit system, a configuration advantageous for reducing switching loss, is therefore employed in high frequency heating equipments. This circuit system is called the single switching element voltage resonance circuit, and it is a system designed to moderate voltage incline by applying the voltage in sine waveform to a semiconductor switching device utilizing the effect of a resonance circuit to reduce the switching loss.

However, the single switching element voltage resonance circuit of the prior art has the following weaknesses.

First, the voltage applied to the semiconductor switching device rises due to the effect of the resonance circuit. This may require the semiconductor switching device or related electrical components to be configured to a higher withstand voltage, resulting in a larger and more expensive power supply unit.

Second, although the ON time of the semiconductor switching device is settable, the OFF time is a function of the behavior of the resonance circuit and is not adjustable as required. This reduces the flexibility of control of the single switching element voltage resonance circuit. More disadvantages are caused in this respect, which will be described below while describing the single switching element voltage resonance circuit of the prior art in more detail.

FIG. 21 shows a circuit diagram of a power supply unit for driving a magnetron in high frequency heating equipment of the prior art.

FIG. 21 shows a power supply circuit for driving a magnetron which is powered from the AC power supply. Looking at FIG. 21 from the left, a full wave rectifier converts AC power supply from AC voltage to DC voltage, and the voltage $V_{DC}$ is applied to a circuit where the semiconductor switching device is connected in series with a parallel circuit comprising a capacitor and leakage transformer (a transformer with magnetic connection lower than 1 between the primary coil and secondary and tertiary coils due to leakage of magnetic flux). This semiconductor switching device operates at high frequencies. Here, an IGBT (Insulated-gate bipolar transistor) is employed as the semiconductor switching device. The leakage transformer and capacitor connected in parallel form a resonance circuit.

If a driving signal $V_G$ is applied to an IGBT gate for turning on the IGBT, a current I flows to the IGBT, passing through the primary coil of the leakage transformer. This is the period $T_1$ in the waveform shown in FIG. 22A. When the IGBT turns off after the time $T_{ON}$, the current starts to flow instead toward the capacitor and resonance is established. This is the period $T_2$. FIG. 22B shows the waveform of the driving signal for IGBT. The energy $W_L$ of the leakage transformer can be defined:

$$W_L = (LI^2)/2 \quad \text{(Equation 1)}$$

where I is the current and L is the inductance of the leakage transformer.

The current I can be defined:

$$I = V_{DC} T_{ON}/L \quad \text{(Equation 2)}$$

where $V_{DC}$ is the voltage of the capacitor, i.e. the DC supply voltage.

When resonance starts, the above energy is transferred to the capacitor, establishing the following equation:

$$WL = (CV^2)/2 + W_{MG} \quad \text{(Equation 3)}$$

where C is the capacitance of the capacitor, V is the voltage of the capacitor, and $W_{MG}$ is the energy consumed in the rectifier and magnetron connected to the secondary coil side of the leakage transformer.

After energy is transferred to the capacitor, energy begins to be supplied from the capacitor to the leakage transformer, and resonance continues while attenuating as shown in a period $T_3$. To sustain stable resonance, it is desirable to replace the energy consumed by the magnetron. Therefore, VG is applied to the IGBT gate to turn the IGBT on again to supply energy to the primary coil in a period $T_4$. The characteristic of the resonance circuit is to reduce the switching loss by turning on the IGBT again at the point where the voltage $V_{CE}$ between the IGBT's collector and emitter falls to zero. FIG. 22C shows the resonance waveform of the primary coil voltage waveform $V_P$.

$V_{CE}$ of the IGBT can be defined:

$$V_{CE} = V_{DC} - V_P \quad \text{(Equation 4)}$$

where $V_P$ is the voltage of the primary coil.

Accordingly, the waveform of $V_{CE}$ has a high voltage peak as shown in FIG. 22D due to the effect of resonance. The time $T_{OFF}$ during the resonance period $T_2$ to $T_3$ is determined by the capacitor, leakage transformer, rectifier connected to the secondary coil, circuit constant of the magnetron, and the quantity of energy provided to the leakage transformer in the circuit shown in FIG. 21. The period T3 in which $V_P \geq V_{DC}$ is desirable for allowing $V_{CE}$ to fall to zero or below. The IGBT is turned on again in the period $T_4$ to replace the energy consumed by the magnetron, thus allowing stable resonance to be established.

Energy provided to the leakage transformer is determined by the ON time $T_{ON}$ of the IGBT, and a shorter ON time $T_{ON}$ translates into a smaller quantity of power. The driving frequency f of IGBT can be defined:

$$f = 1/(T_{ON} + T_{OFF}).$$

Since $T_{OFF}$ is mostly fixed, f rises as $T_{ON}$ becomes shorter, i.e. a smaller quantity of power.

$V_{CE}$ is given by Equation 4, and $V_{CE}$ does not become zero or below unless the relation $V_P \geq V_{DC}$ is satisfied during the period T3. If power is reduced, the energy provided to the leakage transformer, i.e. energy powering the resonance, becomes smaller, and this relation may not be satisfied. This prevents the turning on of the IGBT at zero voltage, resulting in switching loss.

Furthermore, energy for resonance is also determined by the power supply voltage $V_{DC}$ according to Equations (2) and (3). Smaller voltage means lower energy, resulting in greater difficulty in satisfying the relation $V_P \geq V_{DC}$. This is the third disadvantage of the prior art.

A brief explanation of the magnetron is given next.

The magnetron is a vacuum tube for generating microwaves, and two conditions need to exist for the magnetron to be driven. The first is that the cathode temperature may need to be increased to about 2,100 K. The second condition is the application of a high negative voltage between the anode and cathode. To satisfy the first condition, current is supplied to the cathode from the tertiary coil of the leakage transformer to increase the cathode temperature. To satisfy the second condition, the high voltage output of the secondary coil of the leakage transformer is converted to DC at high voltage by the rectifier, and a high DC voltage is applied between the anode and cathode. The relation between the voltage VAC across the anode and cathode of the magnetron and the anode current IA when the cathode temperature is about 2,100 K is shown in FIG. 23.

VBM in FIG. 23 is called the starting voltage, and VBM of −3.8 kV is commonly used in microwave ovens for home use. The power $P_{MG}$ of the magnetron can be defined:

$$P_{MG} = V_{AC} I_A \quad \text{(Equation 5)},$$

about 70% of which is emitted in microwave form.

The frequency of generated microwaves is 2.45 GHz, but low levels of unwanted radio waves at other frequencies are also generated. To eliminate these, the magnetron may require a noise filter comprising a capacitor and a coil.

In the circuit diagram shown in FIG. 21, the tertiary coil of the leakage transformer is connected to the cathode of the magnetron. Power is controlled by the ON time of IGBT, and the ON time is shortened to reduce the power as described above. This reduces the voltage generated in the tertiary coil, resulting in a decrease in the current passing through the cathode. The frequency f also increases. The impedance $Z_L$ of the coil of the noise filter provided in the magnetron can be defined:

$$Z_L = 2 \pi f L_N \quad \text{(Equation 6)}$$

where $L_L$ is the inductance of the coil of the noise filter.

Since the frequency f also rises, the cathode current is suppressed as the impedance becomes higher, leading to a further decrease in the cathode current. This is the fourth disadvantage of the single switching element voltage resonance circuit of the prior art.

The fifth disadvantage is associated with the starting of the magnetron.

The magnetron is not operable unless the cathode temperature reaches a temperature of around 2,100 K. On starting, a certain time is required for the cathode temperature to rise. Since one of the benefits of microwave ovens is high-speed cooking, it is important for the magnetron in a microwave oven to start up as quickly as possible. For this purpose, as large a current as possible is supplied to the cathode when starting, to generate a rapid increase in temperature. However, if a large current is supplied to the cathode on starting, the voltage of the secondary coil simultaneously increases because the tertiary coil for supplying the current to the cathode and the secondary coil for supplying high voltage to the magnetron are configured using a single leakage transformer. In addition, since the magnetron is started from low power by radically shortening the ON time of the IGBT, the impedance of the coil provided to the cathode of the magnetron rises to a high level, thus increasing the suppression of the cathode current. For supplying sufficient cathode current under these conditions, the voltage of the secondary coil may need to be further increased. FIG. 24 shows the change in characteristics with time of the voltage $V_{AC}$ between the anode and cathode from the starting point to the steady state in which the magnetron oscillates normally. During the time $T_S$, the voltage across the secondary coil is high because a large current is supplied to the cathode. Then, after the time $T_S$, the magnetron starts to operate, and $V_{AC}$ drops to $V_{BM}$. $V_{BM}$ is about −3.8 kV, and the voltage generated on starting is about −7 kV. Accordingly, the withstand voltage of the diode and capacitor configuring the rectifier are desirably designed with this voltage taken into account. This is the fifth disadvantage.

Performance requirements for the power supply for driving the magnetron are described next. First, a high voltage may be desirable for driving the magnetron. Therefore, if any foreign substance such as dust attaches to the high voltage portion, sparks may be generated. If this happens, the operation of the circuit must be stopped immediately to avoid fire or smoke production by the components forming the power circuit due to continuous sparking.

In addition, since the magnetron is a vacuum tube, gas may be generated from the copper and tungsten of which it is comprised. If such gas is produced in a portion where the electric field is concentrated in the vacuum tube, sparks may occur inside the tube. If sparks occur, the impedance between the anode and cathode of the magnetron rapidly changes, and this may affect the operation of electric components such as the IGBT. Also, in this case, operation without causing failure of electric components may need to be assured. This is the second requirement.

SUMMARY OF THE INVENTION

The present invention relates to a power supply for driving a magnetron in high frequency heating equipment.

The high frequency heating equipment of the present invention comprises a DC power supply, a leakage transformer connected to the DC power supply, a first semiconductor switching device connected in series to the primary coil of the leakage transformer, a first capacitor, a series circuit comprising a second capacitor and second semiconductor switching device, a driving circuit having an oscillator for driving the first semiconductor switching device and second semiconductor switching device, and a magnetron connected to the secondary coil of the leakage transformer. This configuration allows the adjustment the OFF time of the first semiconductor switching device, the main switching element, by the secondary semiconductor switching device, the auxiliary switching element. At the same time, by the use of the auxiliary second capacitor which has a larger capacitance than that of the first capacitor forming the resonance circuit with the leakage transformer, the voltage applied to the main first semiconductor switching device can be reduced.

AC power supply is rectified to a DC power supply by a total wave rectifier, and a frequency modulation circuit for modulating the frequency in accordance with the signal obtained based on the voltage of the DC power supply is provided in the driving circuit. Moreover, a pulse width modulation circuit is provided in the driving circuit. This allows the expansion of the range of supply voltages or powers for implementing the switching operation where the voltage applied to the main first semiconductor switching device is zero or below.

Electric power is configured to be controlled by changing the ratio of the ON time of pulses for driving the first semiconductor switching device to that for the second semiconductor switching device, and at the same time, keeping the frequency constant. This may prevent any increase in impedance of the coil of the noise filter, resulting in a reduction of the drop rate of the cathode current during decreased power.

A leakage transformer having a tertiary coil for supplying the cathode current to the magnetron, and the magnetron having a cathode with a filter consisting of a capacitor and coil are provided. In addition, a starting frequency setting circuit for setting frequency to reduce impedance of the coil at starting is provided to the driving circuit. This enables the supply of sufficient current to the cathode, and at the same time prevents any increase in voltage across the secondary coil.

The present invention further comprises a DC power supply, a coil connected to the DC power supply, a capacitor connected to the coil, a voltage detector for detecting changes in the voltage of the capacitor, and a comparator for comparing a reference level with the voltage level of the capacitor detected by the voltage detector. If the detected level of the capacitor voltage rises above or falls below the reference level, the driving circuit is designed to stop its operation. This allows the instant breaking of the circuit if sparking occurs.

BRIEF DESCRIPTION OF THE DRAWINGS

FIG. 11A is an output voltage waveform of a $V_{DC}$ detector 65, FIG. 11B is an output waveform of a frequency modulator 29, FIG. 11C is a waveform of saw tooth wave generated by an oscillator 30, and FIG. 11D is an output waveform of a pulse width modulator 28.

FIG. 13A is a voltage waveform of the DC power supply, FIG. 13B is an anode current waveform of the magnetron, and FIG. 13C is a current waveform of the DC power supply.

FIG. 14A is a voltage waveform of the DC power supply, FIG. 14B is an anode current waveform of the magnetron, and FIG. 14C is a current waveform of the DC power supply.

FIG. 19A is a current waveform of the first semiconductor switching device 3, FIG. 19B is a voltage waveform of a capacitor 51, FIG. 19C is an output signal waveform of a comparator 54, and FIG. 19D is a voltage waveform of a capacitor 60 (shown in FIG. 20) forming a stop judgment circuit 19.

FIG. 22A is a current waveform of an IGBT, FIG. 22B is a driving signal waveform of the IGBT, FIG. 22C is a primary coil voltage waveform of the leakage transformer, and FIG. 22D is a collector voltage waveform of the IGBT.

DESCRIPTION OF THE PREFERRED EMBODIMENT

First Exemplary Embodiment

Figure 1:
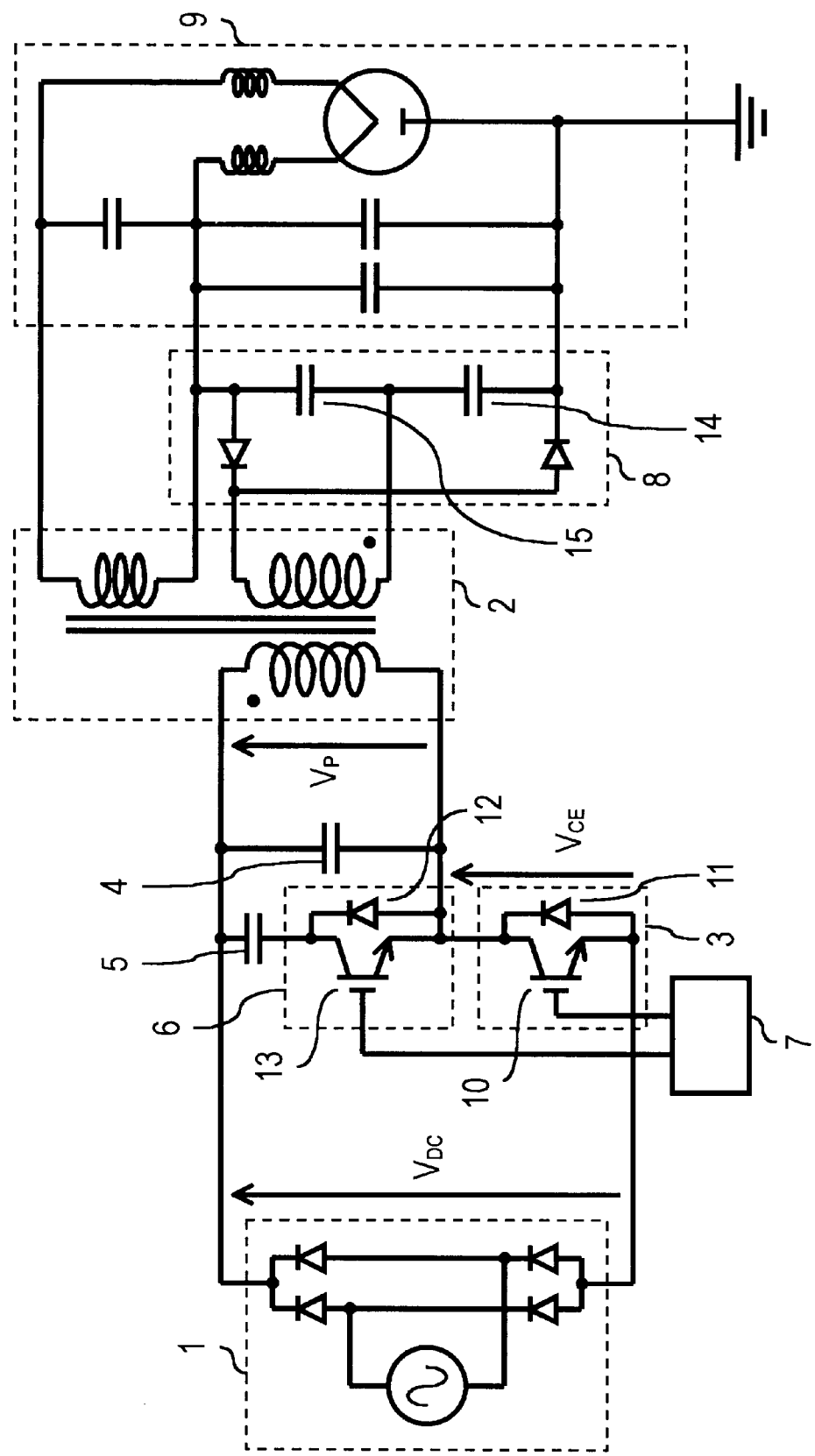
FIG. 1 is a circuit configuration of an electric power converter for driving a magnetron employed in a high frequency heating equipment in accordance with a first exemplary embodiment of the present invention. A rectifier connected to a secondary coil of a leakage transformer employs the full wave voltage doubler rectifier system.

FIG. 1 shows a circuit diagram of an electric power converter for driving a magnetron employed in a high frequency heating equipment in a first exemplary embodiment of the present invention. The high frequency heating equipment of the first exemplary embodiment comprises a DC power supply 1, a leakage transformer 2, a first semiconductor switching device 3, a first capacitor 4, a second capacitor 5, a second semiconductor switching device 6, a driving circuit 7, a full wave voltage doubler rectifier 8, and a magnetron 9. AC power supply is converted to DC voltage $V_{DC}$ from AC voltage by the full wave rectifier, and applied to a circuit where the first semiconductor switching device 3 is connected in series to a parallel circuit comprising the first capacitor 4 and a primary coil of the leakage transformer 2. A series circuit of the second capacitor 5 and the second switching device 6 is connected in parallel to the first capacitor 4. The high voltage output generated in a secondary coil of the leakage transformer 2 is converted to high DC voltage by the full wave voltage doubler rectifier 8, and applied between an anode and a cathode of the magnetron 9. A tertiary coil of the leakage transformer 2 supplies the current to the cathode of the magnetron 9.

The first semiconductor switching device 3 comprises an IGBT 10 and a diode 11 connected in parallel to the IGBT 10. The second semiconductor switching device 6 also comprises an IGBT 13 and a diode 12.

The driving circuit 7 has an oscillator for generating a driving signal for the first semiconductor switching device 3 and the second semiconductor switching device 6. This oscillator generates the signal with a specified frequency and duty to supply the driving signal to the first semiconductor switching device 3. A delayed and inverted signal of the driving signal for the first semiconductor switching device 3 is supplied to the second semiconductor switching device 6.

Figure 2:
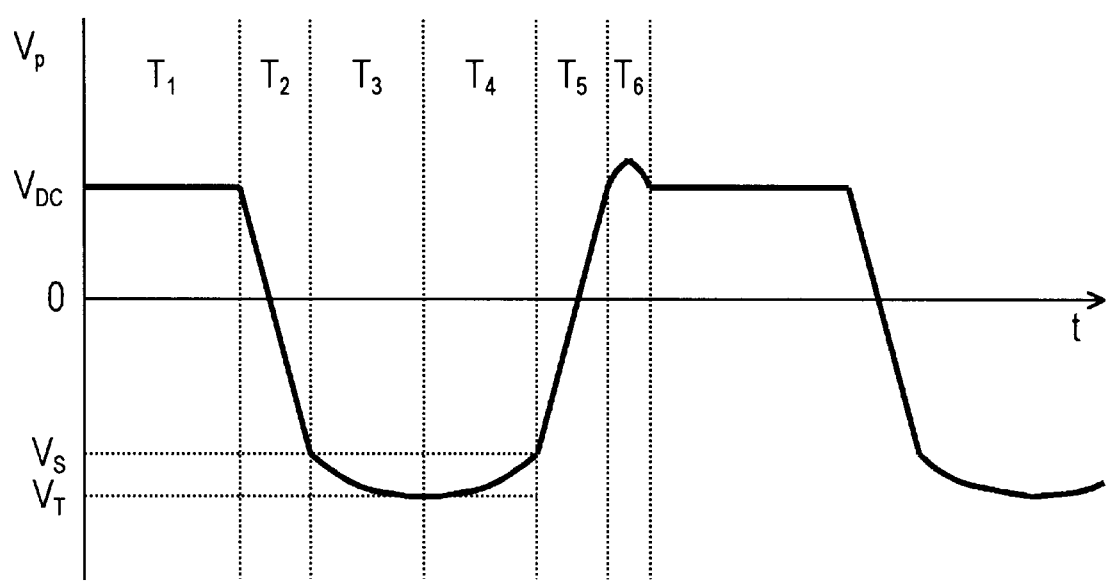
FIG. 2 is a waveform of a primary coil voltage $V_P$ of the leakage transformer for explaining the operation of the circuit in FIG. 1.

The operation of the circuit shown in FIG. 1 is explained with reference to a waveform of the primary coil voltage $V_P$ of the leakage transformer 2 shown in FIG. 2. Voltage $V_{CE}$ of the first semiconductor switching device 3 can be defined using this primary coil voltage $V_P$ and the voltage $V_{DC}$ of the DC power supply 1 as follows:

$$V_{CE}=V_{DC}-V_P \quad \text{(Equation 7)}$$

First, a collector current $I_C$ flows through the primary coil of the leakage transformer 2 when the IGBT 10 is turned on. Since the voltage $V_{CE}$ of the first semiconductor switching device 3 is sufficiently small compared to the voltage $V_{DC}$ of the DC power supply 1 while the IGBT 10 is turned on, the primary coil voltage $V_P$ is nearly equivalent to the voltage $V_{DC}$ of the DC power supply 1. This is a period $T_1$ in FIG. 2. Here, the secondary coil output of the leakage transformer 2 starts to charge a capacitor 15 of the full wave voltage doubler rectifier 8. The magnetron 9 starts to oscillate and the anode current starts to flow to the magnetron 9 when $V_2+V_3$ reaches:

$$V_2+V_3>V_{BM} \quad \text{(Equation 8)}$$

where
  $V_2$: Initial voltage of a capacitor 14,
  $V_3$: Voltage of the capacitor 15, and
  $V_{BM}$: Oscillation starting voltage.

When the first semiconductor switching device 3 is turned off, the current in the primary coil of the leakage transformer 2 starts to flow toward the first capacitor 4. Then, the secondary coil output of the leakage transformer 2 starts to charge the capacitor 14, and the primary coil voltage $V_P$ reduces as shown by a period $T_2$ in FIG. 2. The magnetron 9 starts to oscillate again when Equation 8 is satisfied. When the voltage of the first capacitor 4 reaches the initial voltage $V_S$ of the second capacitor 5, the diode 12 in the second semiconductor switching device 6 turns on, and charging of the second capacitor 5 starts. The primary coil voltage $V_P$ becomes as shown by a period T3 in FIG. 2.

The second capacitor 5 is designed to have larger capacitance than the first capacitor 4, and therefore, reduction of the voltage during the period $T_3$ is suddenly moderated. When the current running from the primary coil of the leakage transformer 2 to the second capacitor 5 starts to run from the second capacitor 5 to the primary coil, on the contrary, the primary coil voltage $V_P$ moves onto a period $T_4$ in FIG. 2. At this point, the IGBT 13 in the second semiconductor switching device 6 may need to be turned on. When the IGBT 13 is cut off at a specified time $T_4$, the current starts to flow from the first capacitor 4 to the primary coil of the leakage transformer 2, and the primary coil voltage $V_P$ increases to move onto a period $T_5$ in FIG. 2. During the period $T_5$, the voltage rises rapidly. When this voltage reaches $V_{DC}$, the voltage of the first semiconductor switching device 3 becomes zero in accordance with Equation 7. The same operation is repeated from the period $T_1$ by driving the first semiconductor switching device 3 again at this point. This realizes a switching operation which enables a reduction of switching loss. The initial voltage $V_S$ of the second capacitor 5 as mentioned above is determined by the specified time T4 in the period T4 at which the second semiconductor switching device 6 is turned on. Specifically, the initial voltage Vs of the second capacitor 5 reduces as the ON time of the second semiconductor switching device 6 is extended, resulting in reducing the voltage of the first semiconductor switching device 3.

As explained above, the OFF time of the first semiconductor switching device 3, or the ON time of the second semiconductor switching device 6, can be freely settable which was not possible with the circuit configuration of the prior art. Furthermore, the voltage of the first semiconductor switching device 3 can be clamped by providing the second capacitor 5 with sufficiently larger capacitance than that of the first capacitor 4.

Second Exemplary Embodiment

Figure 3:
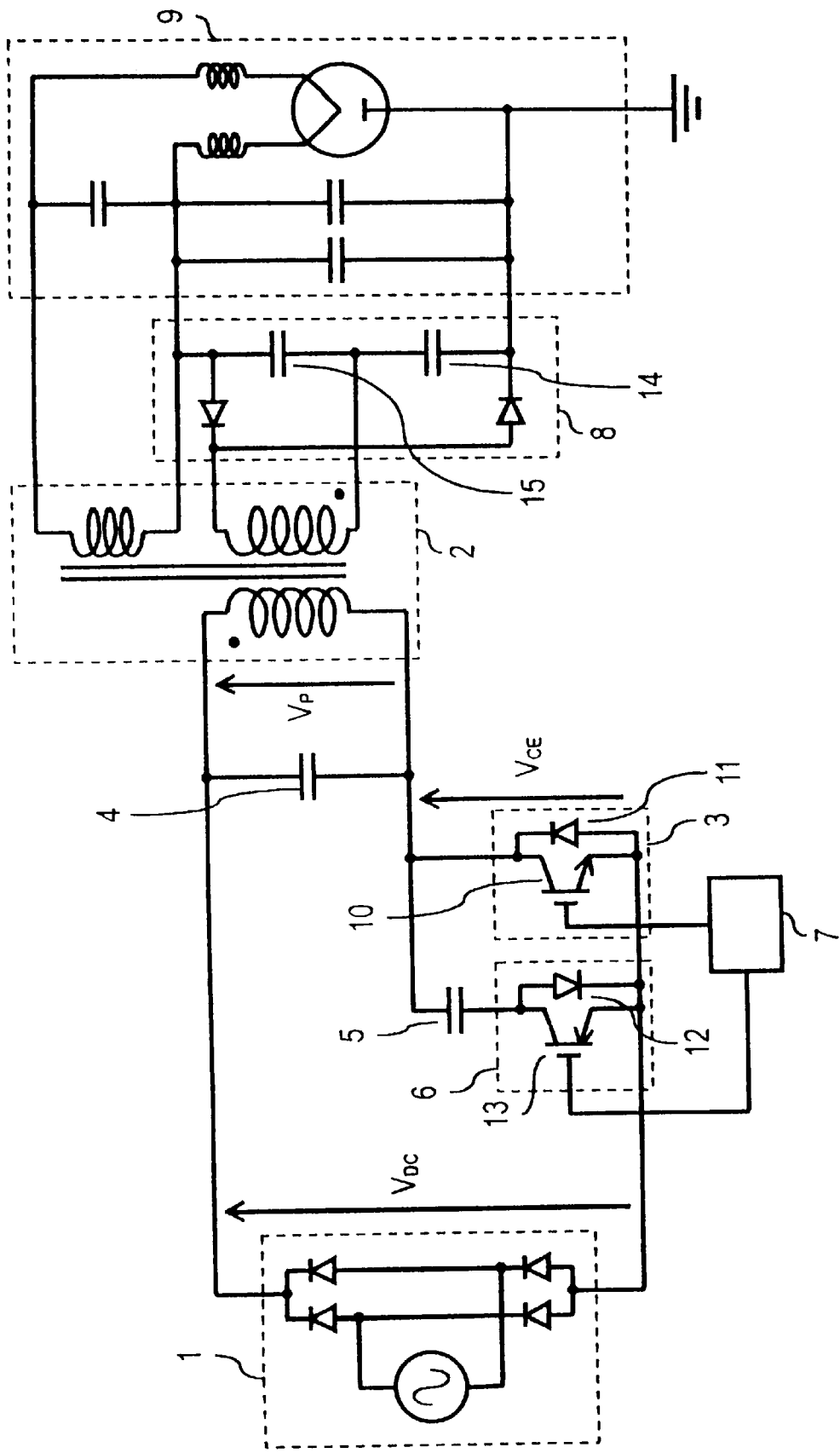
FIG. 3 is a circuit configuration of an electric power converter for driving a magnetron employed in a high frequency heating equipment in accordance with a second exemplary embodiment of the present invention. A series circuit of a second semiconductor switching device and a second capacitor is connected in series to the primary coil of the leakage transformer.

FIG. 3 shows a circuit diagram of an electric power supply converter for driving a magnetron employed in a high frequency heating equipment in a second exemplary embodiment of the present invention.

In FIG. 3, components same as those in FIG. 1 are given the same numeral codes, and thus their explanation is omitted here. A point different from the configuration in FIG. 1 is that the second semiconductor switching device 6 and the second capacitor 5 which are connected in series are connected in series to the primary coil of the leakage transformer 2 and connected in parallel to the first semiconductor switching device 3.

Compared to the operation of the circuit in FIG. 1, the current which flows between the primary coil of the leakage transformer 2 and the second capacitor 5 passes through the DC power supply 1 in the circuit in this exemplary embodiment during periods when the current flows from the primary coil of the leakage transformer 2 to the second capacitor 5, and, on the contrary, from the second capacitor 5 to the primary coil. Other characteristics are the same as the circuit in the first exemplary embodiment.

In case of the circuit configuration in this exemplary embodiment, a pnp-type transistor may preferably be used if a bipolar transistor, for example, is employed as the second semiconductor switching device 6. If MOS transistor or an IGBT is employed, a p-channel IGBT may preferably be used. However, this circuit configuration allows the same electric potential to be maintained for the emitters of the first semiconductor switching device 3 and the second semiconductor switching device 6. This prevents high emitter potential for the second semiconductor switching device 6 compared to the configuration shown in FIG. 1, thus allowing to design a driving circuit with lower withstand voltage.

Third Exemplary Embodiment

Figure 4:
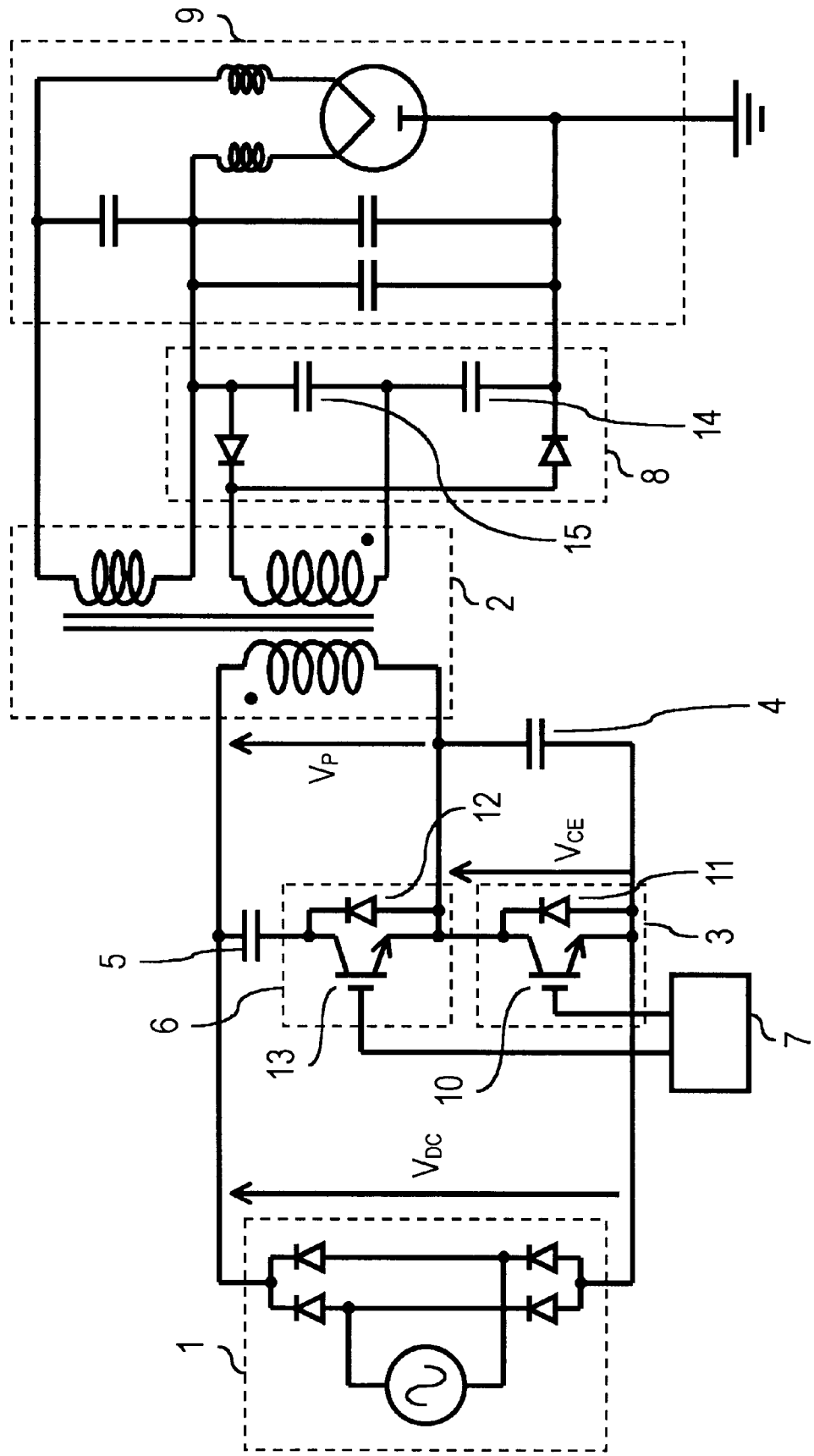
FIG. 4 is a circuit configuration of an electric power converter for driving a magnetron employed in a high frequency heating equipment in accordance with a third exemplary embodiment of the present invention. The first capacitor is connected in series to the primary coil of the leakage transformer. In other words, the first capacitor is connected in parallel to the first semiconductor switching device.

FIG. 4 shows a circuit diagram of an electric power supply converter for driving a magnetron employed in a high frequency heating equipment in a third exemplary embodiment of the present invention.

In FIG. 4, components which are also found in FIG. 1 are given the same numeral codes, and thus their explanation is omitted here. A point different from the configuration in FIG. 1 is that the first capacitor 4 is connected in parallel to the first semiconductor switching device 3.

This allows the current running to the first capacitor 4 to pass through the DC power supply 1. If an IGBT or a MOS transistor is employed in the first semiconductor switching device 3, there is a certain capacitance between the collector and emitter in case of an IGBT and the drain and source in case of a MOS transistor. Accordingly, the capacitance of the first capacitor 4 can be designed smaller for an amount equivalent to the capacitance which exists in the first semiconductor switching device 3 by connecting the first capacitor 4 in parallel to the first semiconductor switching device 3.

Fourth Exemplary Embodiment

Figure 5:
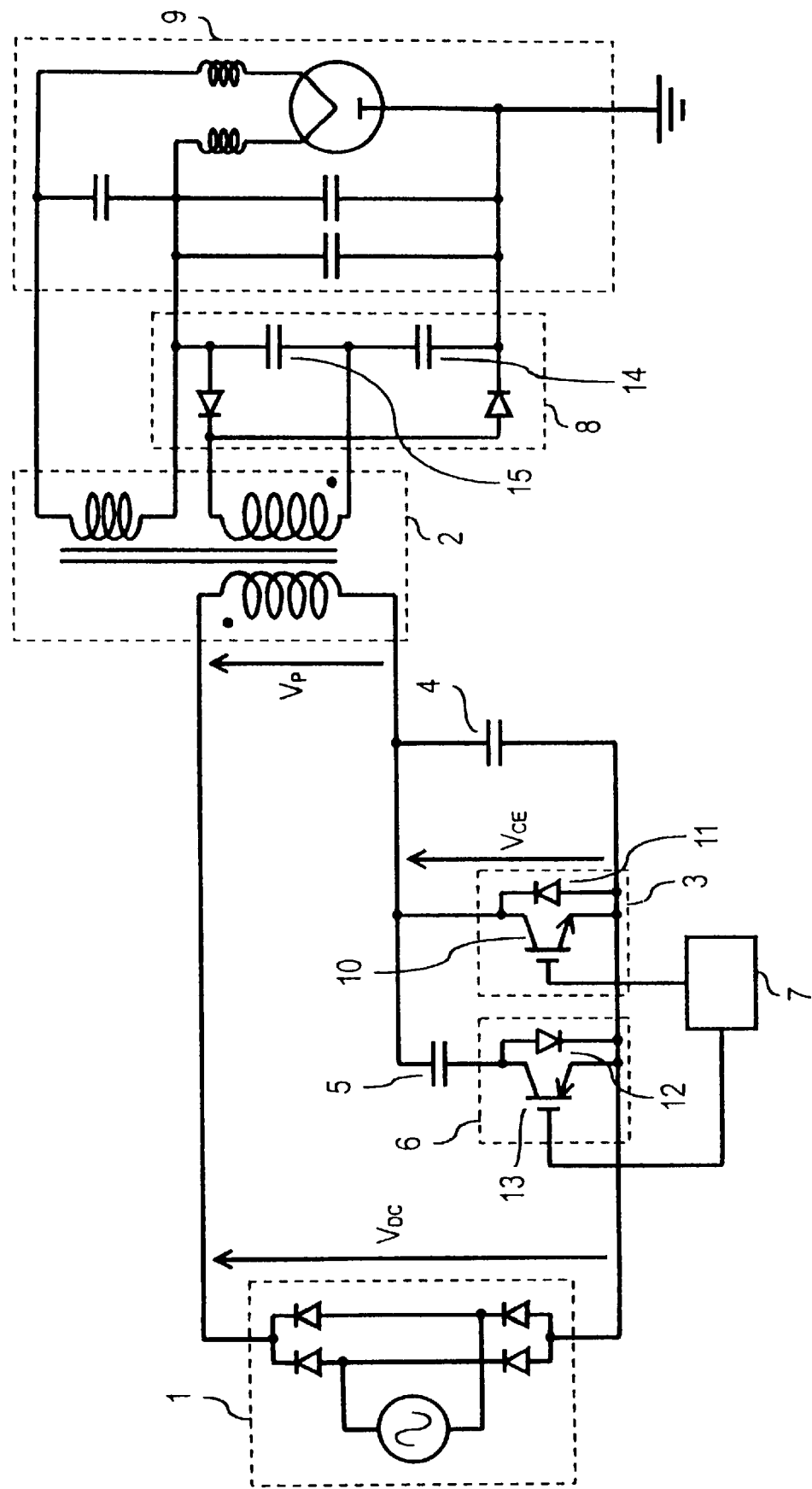
FIG. 5 is a circuit configuration of an electric power converter for driving a magnetron employed in a high frequency heating equipment in accordance with a fourth exemplary embodiment of the present invention. A series circuit of the second semiconductor switching device and the second capacitor, and the first capacitor are connected in series to the primary coil of the leakage transformer, in other words, parallel to the first semiconductor switching device.

FIG. 5 shows a circuit diagram of an electric power supply converter for driving a magnetron employed in a high frequency heating equipment in a fourth exemplary embodiment of the present invention.

In FIG. 5, which are also found in FIG. 1 are given the same numeral codes, and thus their explanation is omitted here. Points different from the configuration in FIG. 1 are that the second semiconductor switching device 6 and the second capacitor 5 connected in series are connected in series to the primary coil of the leakage transformer 2, and that the first capacitor 4 is connected in parallel to the first semiconductor switching device 3. In other words, this is the combined configuration of those shown in FIGS. 4 and 5 to make use of both advantages.

With this configuration, high electric potential may not be applied to the second semiconductor switching device 6, allowing the design of a driving circuit with lower withstand voltage. Furthermore, the capacitance of the first capacitor 4 can be designed smaller for an amount equivalent to the capacitance which exists in the first semiconductor switching device 3.

Fifth Exemplary Embodiment

Figure 6:
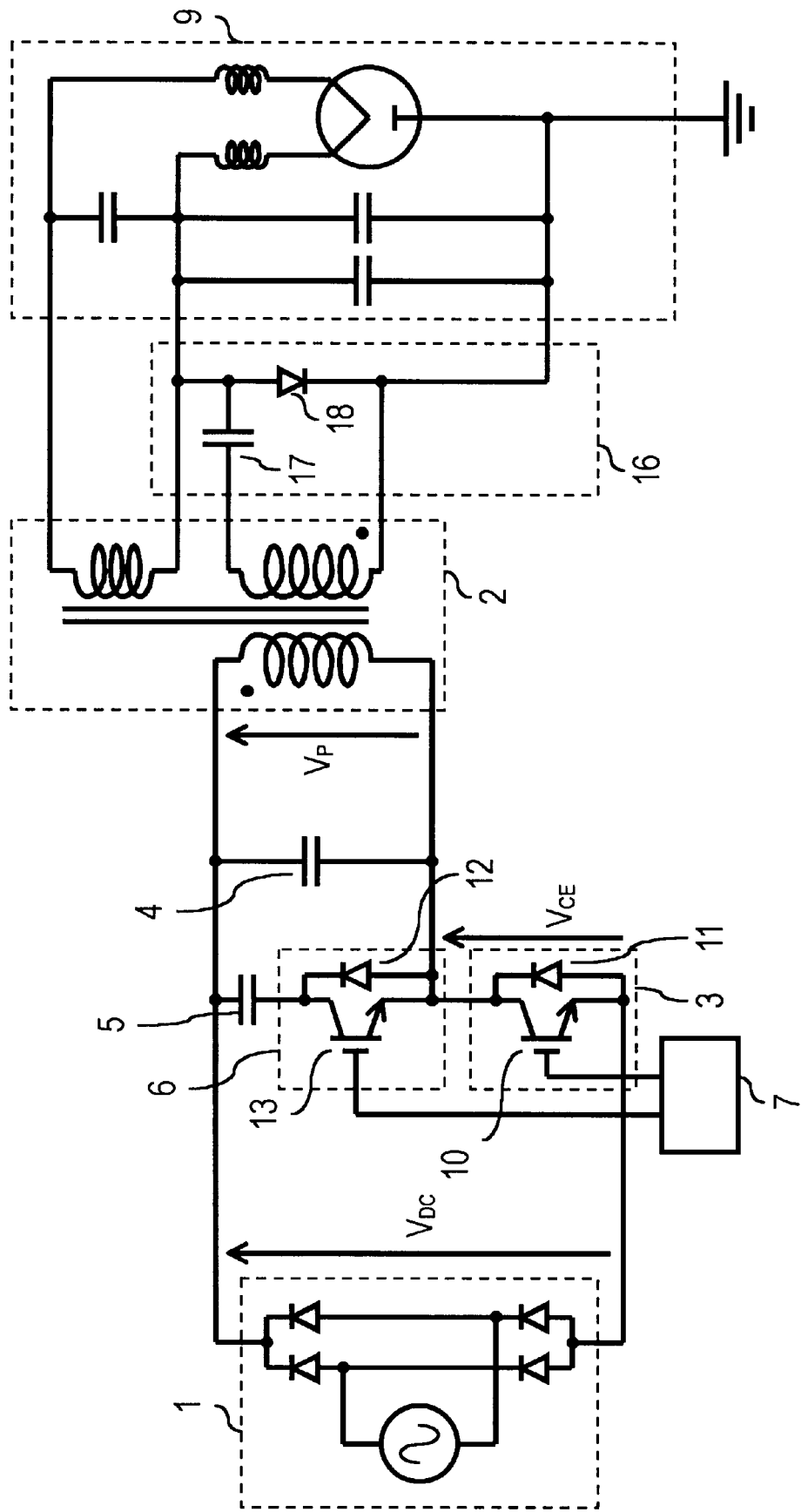
FIG. 6 is a circuit configuration of an electric power converter for driving a magnetron employed in a high frequency heating equipment in accordance with a fifth exemplary embodiment of the present invention. A rectifier connected to the secondary coil of the leakage transformer employs the half wave voltage doubler rectifier system.

FIG. 6 shows a circuit diagram of an electric power supply converter for driving a magnetron employed in a high frequency heating equipment in a fifth exemplary embodiment of the present invention.

In FIG. 6, components which are also found in FIG. 4 are given the same numeral codes, and thus their explanation is omitted here. A point different from the configuration in FIG. 1 is that a rectifier 16 connected to the secondary coil of the leakage transformer 2 comprises a capacitor 17 and a diode 18 and employs the half wave voltage doubler rectifier system. The capacitor 17 is charged by the voltage generated in the secondary coil while the first semiconductor switching device 3 is turned off, and the sum of the voltage generated in the secondary coil of the leakage transformer 2 and the voltage of the capacitor 17 drives the magnetron 9 while the semiconductor switching device 3 is turned on.

A supplementary explanation on full wave voltage doubler rectification, which is a rectifier system employed in the configuration shown in FIG. 1, is given next. In FIG. 1, the capacitor 15 is charged by the voltage generated in the secondary coil of the leakage transformer 2 while the first semiconductor switching device 3 is turned on, and the sum of this voltage and that of the capacitor 14 also drives the magnetron 9. The voltage generated in the secondary coil of the leakage transformer 2 charges the capacitor 14, and the sum of this voltage and that of the capacitor 15 drives the magnetron 9 while the first semiconductor switching device 3 is turned off.

Sixth Exemplary Embodiment

Figure 7:
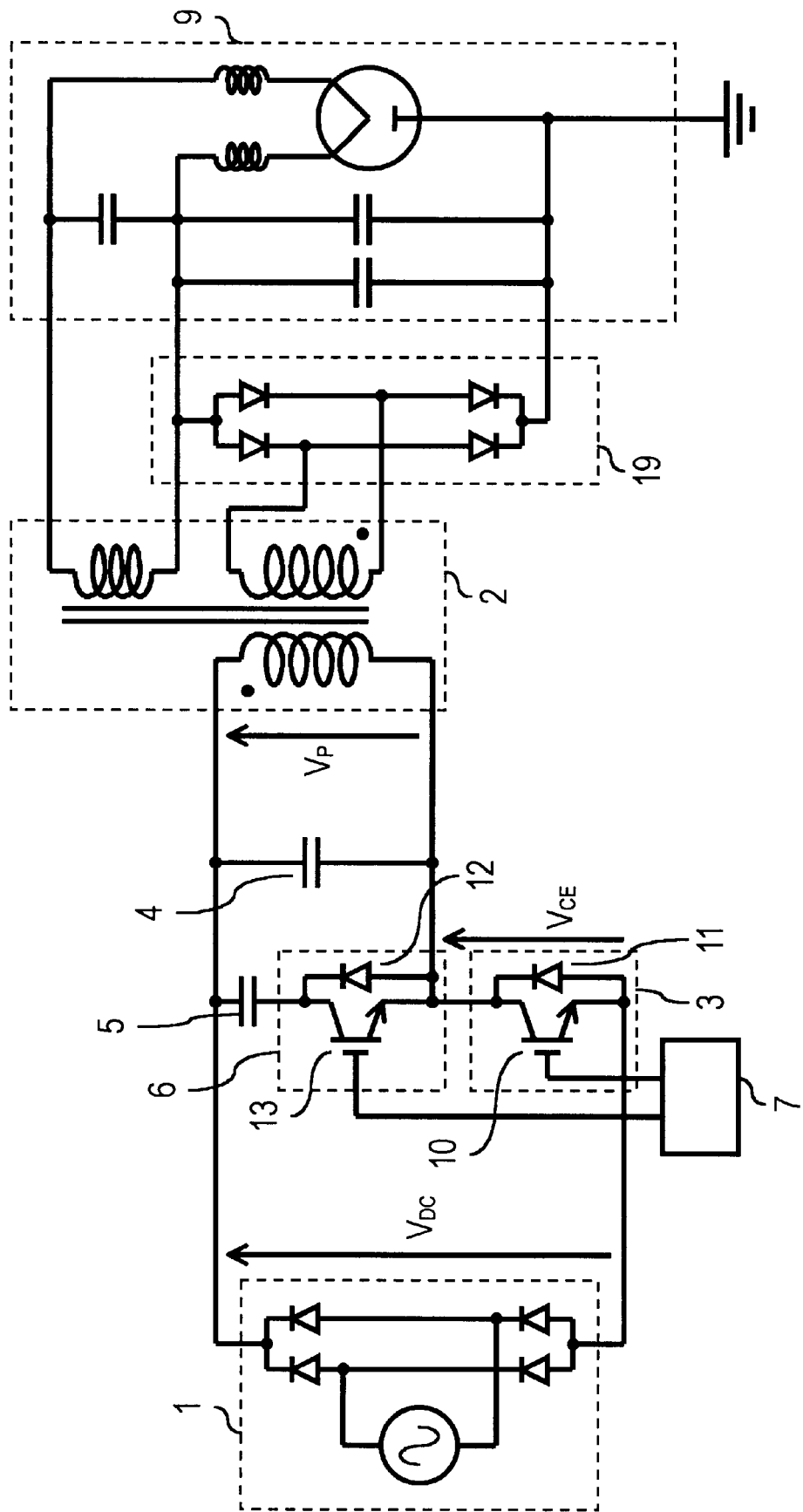
FIG. 7 is a circuit configuration of an electric power converter for driving a magnetron employed in a high frequency heating equipment in accordance with a sixth exemplary embodiment of the present invention. The rectifier connected to the secondary coil of the leakage transformer employs the full wave rectifier system.

FIG. 7 shows a circuit diagram of an electric power supply converter for driving a magnetron employed in a high frequency heating equipment in a sixth exemplary embodiment of the present invention.

In FIG. 7, components which are also found in FIG. 1 are given the same numeral codes, and thus their explanation is omitted here. A point different from the configuration in FIG. 1 is that a rectifier 19 connected to the secondary coil of the leakage transformer 2 comprises four diodes bridge and employs the full wave rectifier system. The number of coils of the secondary coil of the leakage transformer 2 in this system may require about twice as that of the secondary coil of the leakage transformer in the configuration shown in FIG. 1. However, this allows to drive the magnetron 9 in both cases while the first semiconductor switching device 3 is turned on and off, which is the same as the configuration in FIG. 1.

Seventh Exemplary Embodiment

Figure 8:
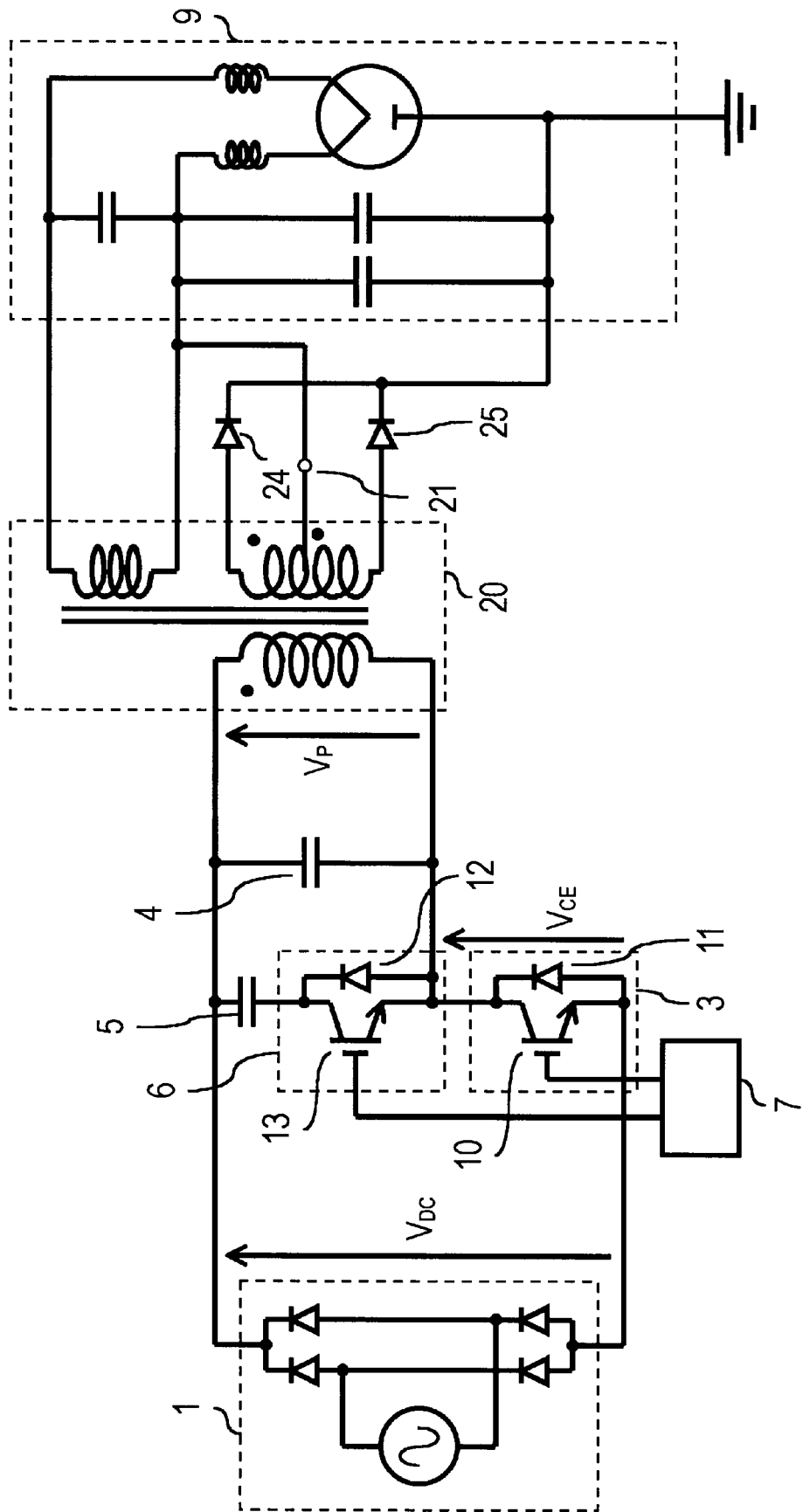
FIG. 8 is a circuit configuration of an electric power converter for driving a magnetron employed in a high frequency heating equipment in accordance with a seventh exemplary embodiment of the present invention. The secondary coil of the leakage transformer is divided into two parts and a center tap is provided.

FIG. 8 shows a circuit diagram of an electric power supply converter for driving a magnetron employed in a high frequency heating equipment in a seventh exemplary embodiment of the present invention.

In FIG. 8, components which are also found in FIG. 1 are given the same numeral codes, and thus their explanation is omitted here. A point different from the configuration in FIG.

1 is that the secondary coil of a leakage transformer 20 in FIG. 8 is divided into two parts and a center tap 21 is provided. Two divided coils are closely coupled. A diode 24 is turned on while the first semiconductor switching device 3 is turned on to apply voltage for driving the magnetron 9.

A diode 25 is turned on while the first semiconductor switching device 3 is turned off to apply voltage for driving the magnetron 9.

The common characteristics in the configurations shown in FIGS. 1, 6, 7, and 8 are that energy in the leakage transformer 2 or 20 is consumed by driving the magnetron 9 or charging the capacitor of the rectifier connected to the secondary coil while the first semiconductor switching device 3 is both turned on and off. This improves efficiency of the use of the leakage transformer.

Figure 9:
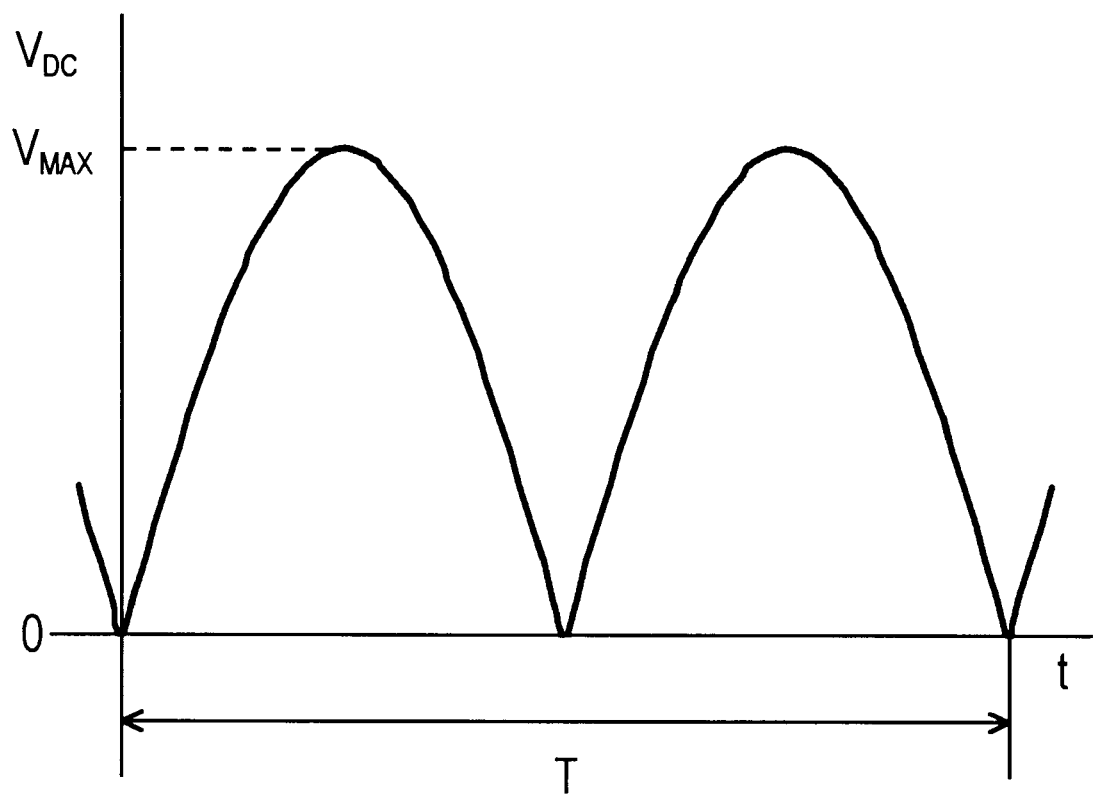
FIG. 9 is a voltage waveform $V_{DC}$ of the DC power supply which is a rectified AC power supply.

The DC power supply 1 in FIG. 1 is generated by rectifying the AC power supply. The voltage waveform $V_{DC}$ of the DC power supply 1 will be as shown in FIG. 9. A period T in FIG. 9 is the period of the AC power supply, and the peak voltage $V_{MAX}$ is $\sqrt{2}$ time of the effective voltage of the AC power supply. Since this voltage waveform changes from about 0V to $V_{MAX}$, the resonance energy also depends on the voltage $V_{DC}$ of the power supply 1 as described in the prior art. Specifically, the resonance energy becomes smaller as the supply voltage becomes smaller, making it more difficult to reduce voltage applied to the semiconductor switching device to zero. Accordingly, the voltage applied to the semiconductor switching device can be reduced to zero more easily by extending the ON time of the first semiconductor switching device 3, as the supply voltage lowers, to increase the resonance energy of the leakage transformer 2.

Eighth Exemplary Embodiment

Figure 10:
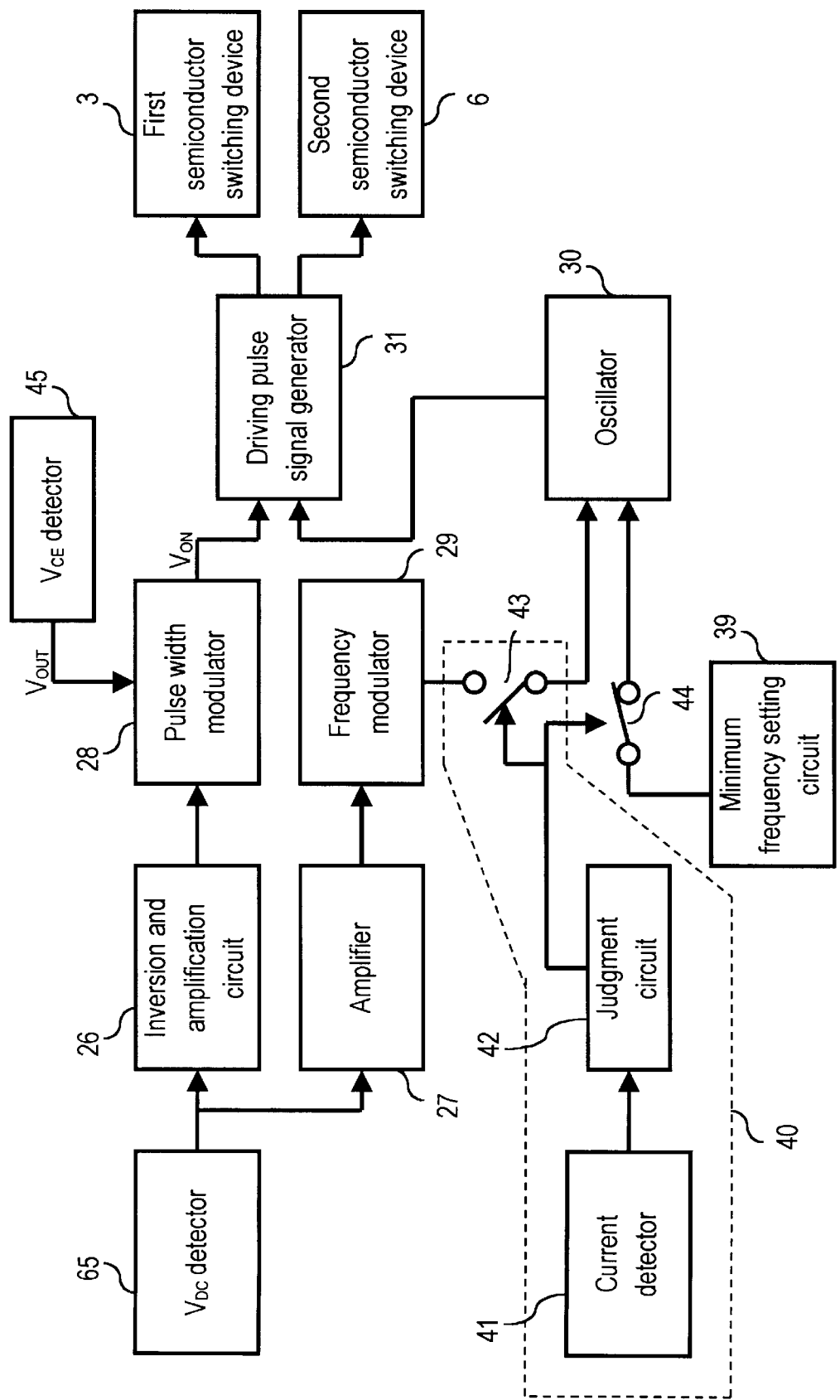
FIG. 10 is a block diagram of a driving circuit of the electric power converter for driving the magnetron in accordance with an eighth exemplary embodiment of the present invention.

FIG. 10 shows a block diagram of the driving circuit 7 for explaining an eighth exemplary embodiment of the present invention. An inversion and amplification circuit 26 and an amplifier 27 receive the output signal of a $V_{DC}$ detector 65 which detects the voltage $V_{DC}$ of the DC power supply 1. A pulse width modulator 28 receives the output of the inversion and amplification circuit 26, and a frequency modulator 29 receives the output of the amplifier 27. An oscillator 30 generates a saw tooth wave of the frequency set by the frequency modulator 29. A driving pulse signal generator 31 generates a driving pulse signal for driving the first semiconductor switching device 3 and the second semiconductor switching device 6. The driving pulse signal generator 31 is designed to generated the driving pulse signal with the pulse width set by the pulse width modulator 28 and in accordance with the frequency set by the oscillator 30.

Next, a condition to keep a constant current I in the leakage transformer 2 without being affected by the supply voltage $V_{DC}$ (voltage of the DC power supply 1) is examined. The supply voltage $V_{DC}$ can be defined:

$$V_{DC} = \sqrt{2} E_0 \text{ SIN } (\omega t)$$

where $E_0$ is an effective value of the AC power supply, $\omega$ is the angular frequency of the AC power supply, and t is time.

Since the current I of the leakage transformer can be defined according to Equation 2, $T_{ON}$ in Equation 2 may need to satisfy the following in order to keep the constant current in the leakage transformer without being affected by the voltage:

$$T_{ON} = T_0 / \text{SIN } (\omega t)$$

where $T_0$ is a specified value.

Accordingly, the output signal of the $V_{DC}$ detector 65 is inverted and amplified by the inversion and amplification circuit 26, and then input to the pulse width modulator 28. The current I in the leakage transformer 2 is kept constant regardless of the supply voltage $V_{DC}$ by having the ON time $T_{ON}$ of the semiconductor switching device to satisfy the above condition.

Since the ON time $T_{ON}$ of the driving pulse extends as the supply voltage $V_{DC}$ becomes lower, the period T may need to be made longer. In other words, the frequency f may need to be reduced. Therefore, the output signal of the $V_{DC}$ detector 65 is amplified by the amplifier 27 and then input to the frequency modulator 29 so as to increase the frequency as the supply voltage $V_{DC}$ increases.

Figure 11A:
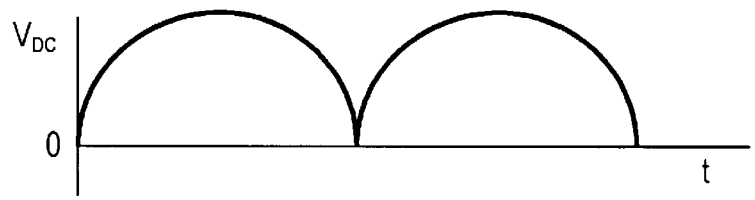
FIGS. 11A to 11D are waveforms related to the driving circuit in FIG. 10 with time t plotted along the abscissa.
Figure 11B:
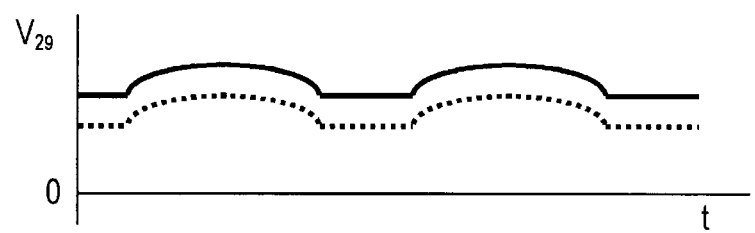
Figure 11C:
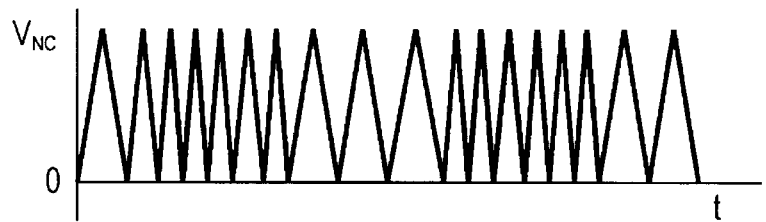
Figure 11D:
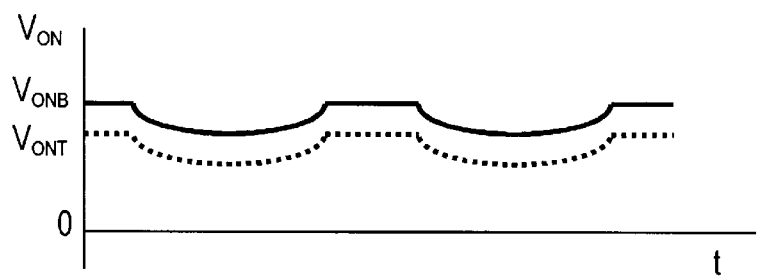

FIG. 11A shows the output voltage waveform $V_{DC}$ of the $V_{DC}$ detector 65. It is an envelope based on the waveform created by full wave rectification of the AC power supply. FIG. 11B shows an output waveform $V_{29}$ of the frequency modulator 29. FIG. 11C shows a saw tooth wave after frequency modulation generated by the oscillator 30 which is created based on the signal shown in FIG. 11B. FIG. 11D shows an output waveform $V_{ON}$ of the pulse width modulator 28, which is an inverted waveform of the FIG. 11A.

Figure 12A:
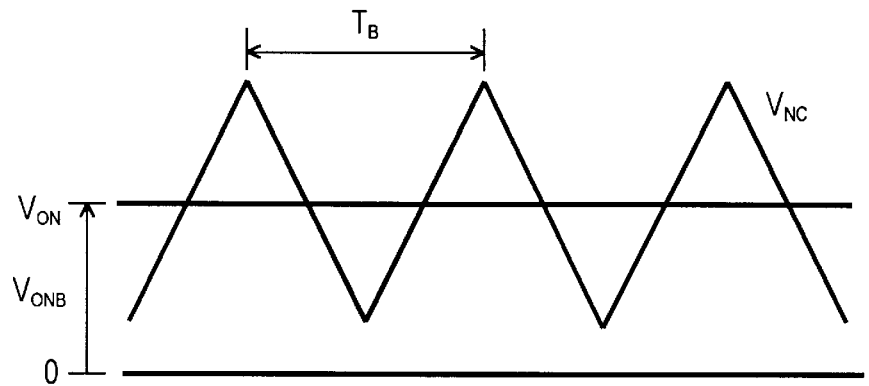
FIGS. 12A to 12D are waveforms in a driving pulse signal generator 31 shown in FIG. 10.
Figure 12B:
Figure 12C:
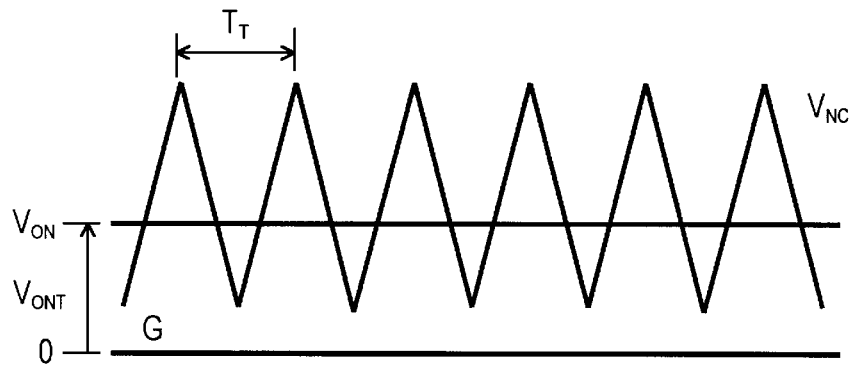
Figure 12D:

FIGS. 12A to 12D show a part of waveform processing implemented in the driving pulse signal generator 31. FIGS. 12A and 12C show how a saw tooth waveform $V_{NC}$ after frequency modulation in FIG. 11C and the output waveform $V_{ON}$ of the pulse width modulator 28 in FIG. 11D are compared. FIG. 12A shows a magnified view of a bottom part of the envelope, that is a low supply voltage portion, and FIG. 12C is a top part of the envelope, that is a high supply voltage portion. Comparing FIGS. 12A and 12C, a period $T_B$ of the saw tooth wave $V_{NC}$ in FIG. 12A is $T_B > T_T$ compared to a period $T_T$ of the saw tooth wave $V_{NC}$ in FIG. 12C. With regard to the output $V_{ON}$ of the pulse width modulator 28, $V_{ONB} > B_{ONT}$ when $V_{ON}$ in FIG. 12A is considered $V_{ONB}$ and $V_{ON}$ in FIG. 12C is considered $V_{ONT}$. FIG. 12B shows a signal output during $V_{ON} > V_{NC}$ in FIG. 12A, and this is a pulse signal for driving the first semiconductor switching device 3. At portion where the supply voltage is low, the ON time of the semiconductor switching device 3 is extended, and the period is also proportionally extended to increase energy provided to the leakage transformer so that voltage applied to the semiconductor switching device becomes zero. At a portion where the supply voltage is high, the ON time of the first semiconductor switching device 3 is shortened, and the period is also proportionally shortened to reduce energy provided to the leakage transformer to an extent that the zero voltage is applied to the semiconductor switching device.

With the above control, the ON and OFF operation of the semiconductor switching device can be implemented under zero voltage even if voltage of the power supply greatly changes.

Figure 13A:
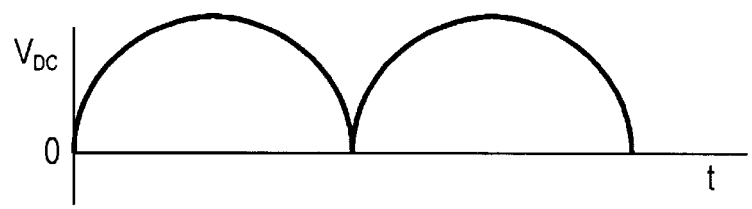
FIGS. 13A to 13C show the case when pulse width modulation and frequency modulation take place.
Figure 13B:
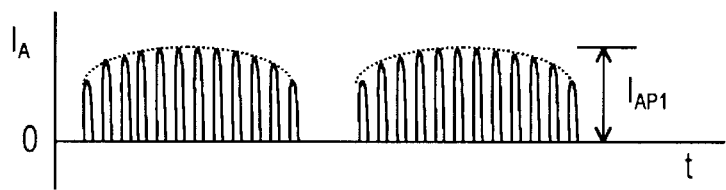
Figure 13C:
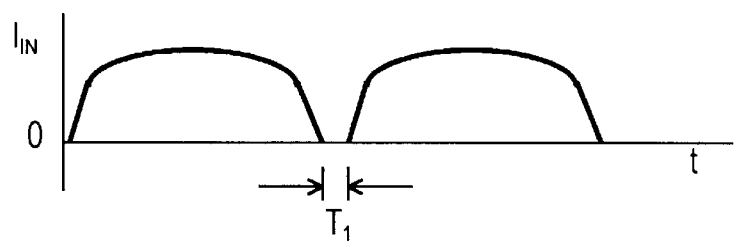
Figure 14A:
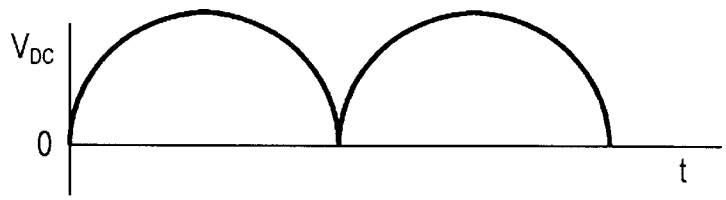
FIGS. 14A to 14C show the case when there is no pulse width modulation and frequency modulation.
Figure 14B:
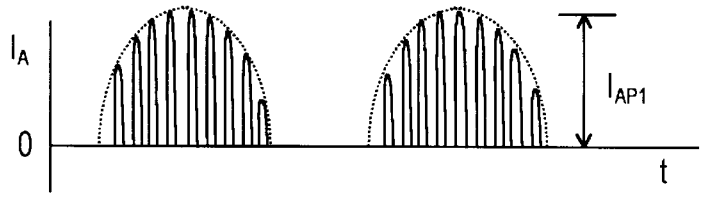
Figure 14C:
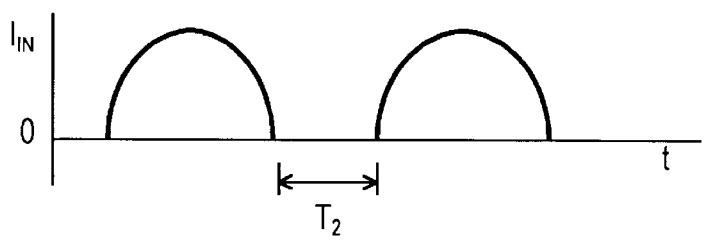

Next, the anode current of the magnetron which is an advantage of the present invention is explained with reference to FIG. 13. FIG. 13A shows the voltage waveform $V_{DC}$ of the DC power supply 1, FIG. 13B shows anode current $I_A$ of the magnetron which is proportionate to the output, and FIG. 13C shows, a current waveform $I_{IN}$ of the DC power supply 1 which has the same shape as the envelope of the anode current waveform indicated by a dotted line of the anode current waveform in FIG. 13B. The characteristic in FIG. 13B is that it suppresses the output at around the top part of the envelope where the frequency is high and the ON time of the first semiconductor switching device is also short, and that it increases the output at around the bottom part of the envelope where the frequency is low and the ON time of the first semiconductor switching device is long, due to the effect of the pulse width modulation and frequency modulation. This makes the envelope of the anode current waveform nearly trapezoid. For comparison, FIGS. 14A–C shows a waveform when the pulse width and frequency are not modulated. FIG. 14A shows the voltage waveform $V_{DC}$ of the DC power supply 1, FIG. 14B shows the anode current $I_A$ of the magnetron, and FIG. 14C shows the current waveform $I_{IN}$ of the DC power supply 1. Comparing peaks $I_{AP1}$ and $I_{AP2}$ of the respective anode current waveforms $I_A$ in FIGS. 13B and 14B, $I_{AP1}<I_{AP2}$ is realized under the same power level.

Degradation of the magnetron has a close relation with the peak of the anode current. Higher peak tends to accelerate degradation of the magnetron. Accordingly, if the peak of the anode current can be reduced by the effect of pulse width modulation and frequency modulation as shown in FIG. 13B, degradation of the magnetron can be suppressed.

Moreover, in the input current waveform shown in FIG. 13C, the supply voltage during the period $T_1$, when the current is not running, is too low that the voltage applied between the anode and cathode of the magnetron becomes lower than the oscillation starting voltage $V_{BM}$ of the magnetron. The anode current thus does not flow, nor does the input current. The period $T_1$ when the input current does not flow compared to the period $T_2$ shown in FIG. 14C is $T_1<T_2$. As a result, a high frequency component of the input current waveform shown in FIG. 13C becomes smaller than the input current waveform shown in FIG. 14C, enabling improvement of the power factor.

Figure 15:
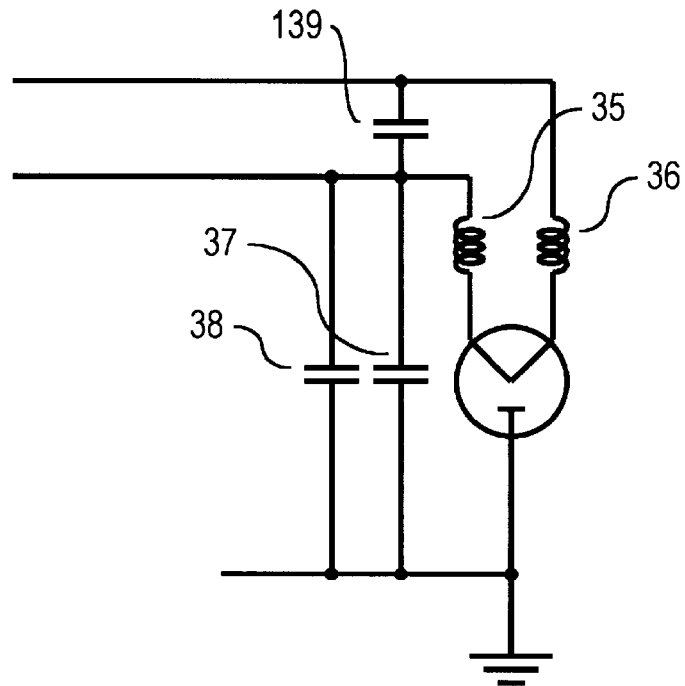
FIG. 15 is a circuit diagram of a filter used in the magnetron.

Next, a method to remove noise and run large cathode current at starting in the present invention is explained. Since the magnetron generates noise in the TV frequency band, a filter is provided to remove this noise. The filter, as shown in FIG. 15, comprises coils 35 and 36 inserted in series to the cathode, capacitors 37 and 38 connected between the anode and cathode, and a capacitor 139 connected in parallel to the cathode. Impedance $Z_C$ of the cathode is about 0.3Ω, and impedance $Z_L$ of the coils 35 and 36 can be defined by Equation 6 where f is the frequency of the cathode current. If the frequency is 40 kHz, impedance $Z_L$ will be about 0.5Ω. This value is about the same as the impedance $Z_C$ of the cathode, and it is a major factor that determines the cathode current level. As described in the prior art, large cathode current may be desirable for prompt start-up of the magnetron. It is therefore apparent that impedance of the coils 35 and 36 may desirably be reduced by decreasing the frequency for this purpose. For example, if the frequency is dropped to 20 kHz, coil impedance will be a half of that at about 40 kHz according to Equation 6. This enables an increase of the cathode current.

The frequency of a saw tooth wave generated by the oscillator 30 at starting is set to the driving circuit 7 in FIG. 10 by a minimum frequency setting circuit 39. In other words, by operating with lower frequency at start-up than during the normal operation, impedance of the coils 35 and 36 forming the filter of the magnetron can be reduced, thereby increasing the cathode current.

In addition, in FIG. 10, a frequency modulation switching circuit 40 cuts the signal from the frequency modulator 29 at start-up to prevent modulation. This enables operation at a fixed low frequency set by the minimum frequency setting circuit 39 regardless of a voltage level of the DC power supply at starting.

The frequency modulation switching circuit 40 comprises a current detector 41, a judgment circuit 42, and switches 43 and 44. When the magnetron oscillates, the anode current runs through the capacitor or the diode of the full wave voltage doubler rectifier 8 in FIG. 1. Accordingly, the current detector 41 can detect the current to the diode, capacitor, or anode using the current transformer. The judgment circuit 42 judges whether the magnetron is oscillating from the output level of the current detector 41. A certain dark current flows even if the magnetron is not oscillating. Since the filter is provided to the magnetron as explained in FIG. 15, the current also flows through its capacitor. In addition, charging or discharging current of the capacitor also flows in the diode and capacitor forming the full wave voltage doubler rectifier 8 in FIG. 1. Since such current level is extremely low, the judgment circuit 42 can differentiate it from the current that flows when the magnetron is oscillating. When the magnetron is not oscillating, the judgment circuit 42 opens the switch 43 to cut the signal of the frequency modulator 43 to the oscillator 30, and at the same time, the switch 44 is closed to send the signal of the minimum frequency setting circuit 39 to the oscillator 30. When the judgment circuit 42 judges that the magnetron is oscillating, the switch 43 is closed and the switch 44 is opened at the same time to modulate the frequency. The minimum frequency setting circuit 39 has a function to set the minimum frequency which avoids excessive cathode current flow or audio frequency. The minimum frequency is set to 20 kHz or above.

By reducing the frequency at starting, sufficient current can be applied, and thus there is no need for applying large voltage to the secondary coil of the leakage transformer 2 at start-up as it is in the prior art. The secondary coil voltage is proportionate to the primary coil voltage, and the DC supply voltage $V_{DC}$, the voltage $V_{CE}$ applied to the first semiconductor switching device, and the primary coil voltage $V_{L1}$ are in the following relation:

$$V_{DC}=V_{L1}+V_{CE}. \qquad \text{(Equation 9)}$$

Thus, in order to apply an appropriate level of the secondary coil voltage, $V_{CE}$ may need to be controlled to a suitable voltage. Since $V_{CE}$ is lower than the secondary coil voltage, its advantage is that the voltage is easier to be detected. In addition, the leakage transformer also insulates between the primary coil and the secondary coil. When the secondary coil voltage is detected, its signal may need to be transmitted to the driving circuit connected to the primary coil side using an insulated means such as a photocoupler. This configuration may be complicated. A method to detect the voltage $V_{CE}$ of the first semiconductor switching device thus also has an advantage to simplify the configuration.

The driving circuit 7 shown in FIG. 10 is provided with the $V_{CE}$ detector 45 for detecting the voltage $V_{CE}$ of the first semiconductor switching device 3. The output signal $V_{OUT}$ (refer to FIG. 10 and FIG. 16 ) of the $V_{CE}$ detector 45 is input to the pulse width modulator 28. The $V_{CE}$ detector 45 gives an effect to the pulse width modulator 28 as shown in FIG. 11D at start-up. Specifically, A waveform $V_{ON}$ in a solid line in FIG. 11D is the output waveform of the pulse width modulator 28 when the $V_{CE}$ detector 45 is not in operation. A dotted line is the output waveform when the $V_{CE}$ detector 45 is in operation. It is apparent that the $V_{CE}$ detector 45 reduces the voltage level of $V_{ON}$. Accordingly, the time width of the pulse signal for driving the first semiconductor switching device 3 may be narrowed by reducing the level of the output waveform $V_{ON}$ of the pulse width modulator 28 to control the is voltage $V_{CE}$ in the first semiconductor switching device 3 to an appropriate level. As a result, the secondary coil voltage is controlled to a minimum necessary level for supplying an appropriate cathode current.

Figure 16:
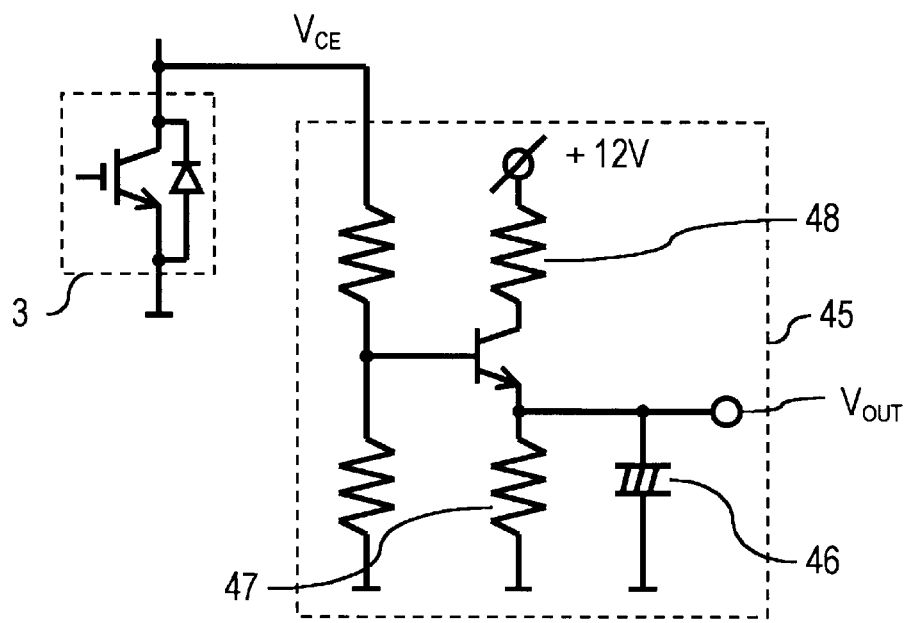
FIG. 16 is a circuit diagram of a $V_{CE}$ detector 45 for detecting a voltage $V_{CE}$ of the first semiconductor switching device 3.
Figure 17A:
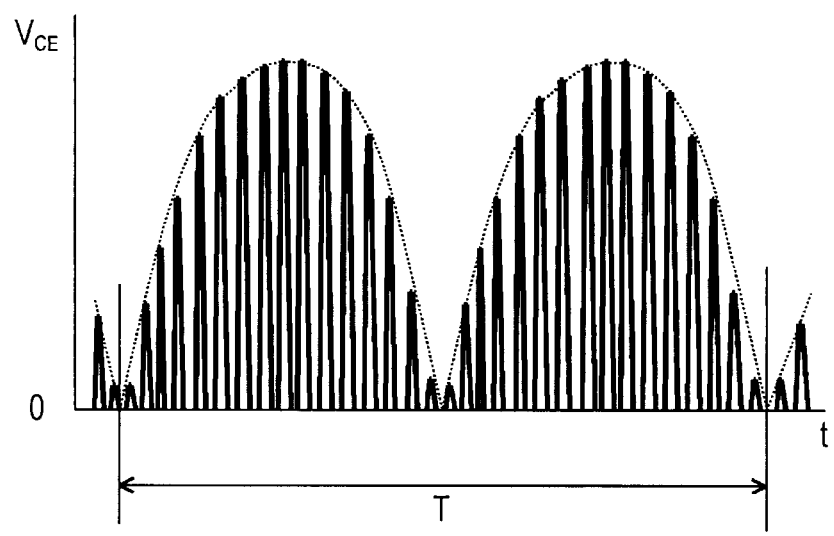
FIG. 17A is a waveform of the voltage $V_{CE}$ of the first semiconductor switching device 3.
Figure 17B:
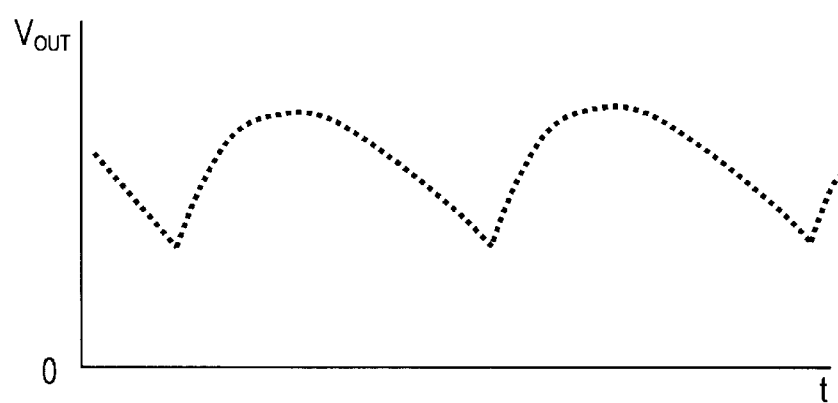
FIG. 17B is a waveform of output voltage of the $V_{CE}$ detector 45.

FIG. 16 shows an example of the configuration of the $V_{CE}$ detector 45 for detecting the voltage $V_{CE}$ of the first semiconductor switching device 3. The voltage $V_{CE}$ is divided by resistance for driving the transistor to charge a capacitor 46. The capacitor 46 is discharged at a resistance 47 connected in parallel. The voltage $V_{OUT}$ of this capacitor 46 is a signal input to the pulse width modulator 28. FIG. 17A shows a waveform of the voltage $V_{CE}$ of the first semiconductor switching device 3. The period T is the period of the AC power supply, and it is, for example, about 16 msec. Since the first semiconductor switching device 3 operates at the period of 50 sec or below, the waveform of the collector voltage $V_{CE}$ in FIG. 17A contains 320 periods in a half period. However, the waveform in FIG. 17A is simplified. Since the collector voltage $V_{CE}$ of the first semiconductor switching device 3 has a pulse waveform, control may become unstable if this information is directly input to the pulse width modulator 28. Therefore, a transistor is driven by the divided voltage of $V_{CE}$ as shown in FIG. 16, and the capacitor 46 is charged through the resistance 48 connected to the power supply. The capacitor 46 is discharged through the resistance 47. The time constant for charging and discharging is set to a period shorter than that of the AC power supply, and longer than the driving period of the first semiconductor switching device 3. This enables to output the voltage $V_{OUT}$, shown in FIG. 17B, close to the envelope of the voltage $V_{CE}$ of the first semiconductor switching device 3 shown by a broken line in FIG. 17B. Accordingly, stable operation can be assured by supplying this $V_{OUT}$ to the pulse width modulator 28.

As described above, the filter is provided to the magnetron, and impedance of the coil in the filter changes with the frequency, resulting in changing the cathode current. With the configuration of the single switching device voltage resonance circuit of the prior art, the output is reduced by shortening the ON time of the semiconductor switching device, resulting in greatly reducing the cathode current due to increase in frequency. Accordingly, the driving circuit of the present invention adjust the ON time of the first semiconductor switching device 3 to control the output, and the signal of the frequency modulator 29 which changes responsive to the aforementioned supply voltage waveform is kept constant regardless of the output. The frequency at a specific point of the envelope at controlling the output thus does not change, thereby suppressing reduction of the cathode current at low output. This enables to keep an appropriate cathode temperature at low output, allowing to realize lower output than that of the prior art. This leads to significant improvement in cooking performance, in particular, food defrosting performance.

Ninth Exemplary Embodiment

Figure 18:
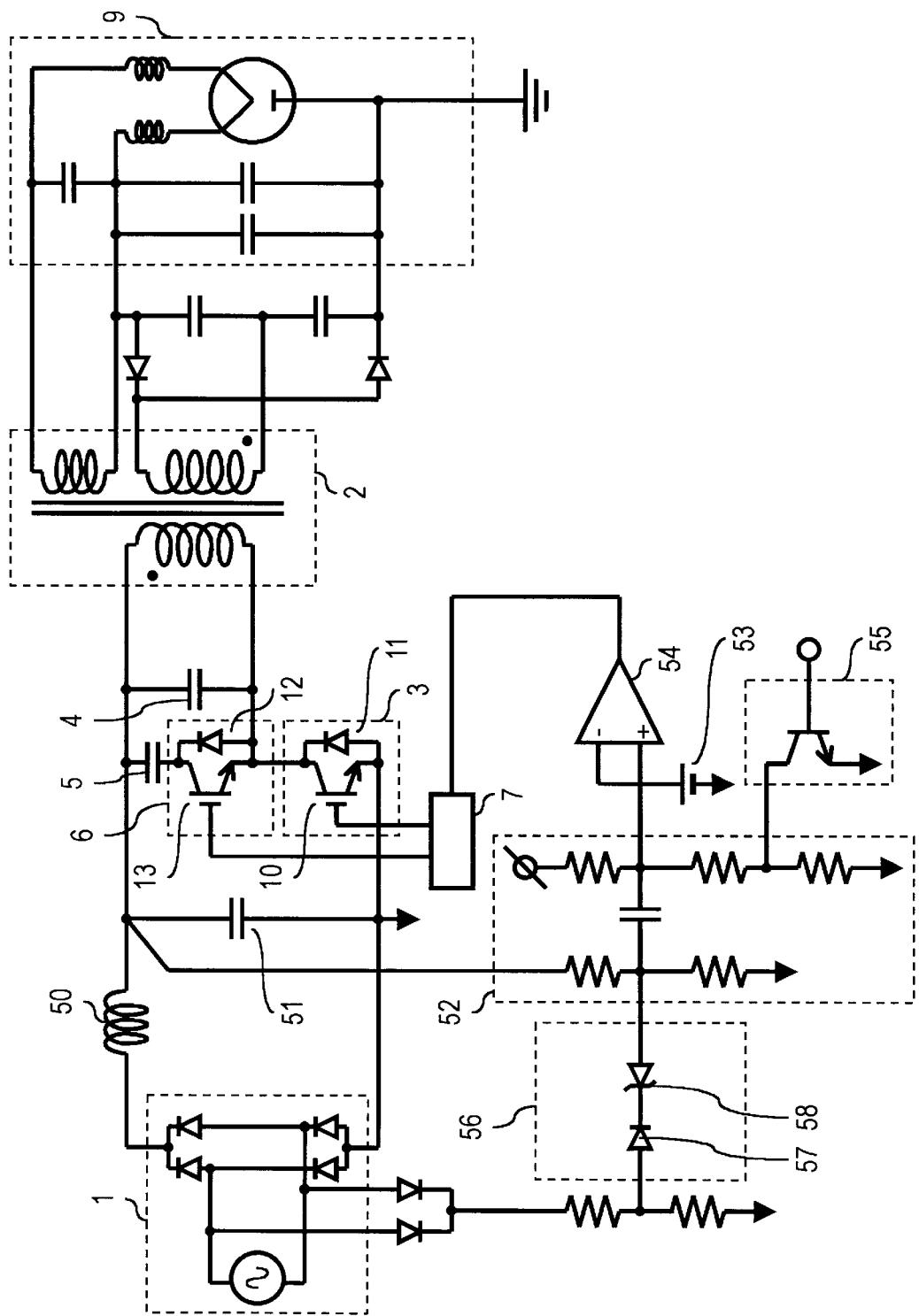
FIG. 18 is a circuit configuration of an electric power converter for driving a magnetron employed in a high frequency heating equipment in accordance with a ninth exemplary embodiment of the present invention.

Measures against sparking and lightning in a ninth exemplary embodiment is explained with reference to FIG. 18. High voltage is required for driving the magnetron, and spark may occur if dust or oil smoke attaches a portion carrying high voltage. If spark occurs, it is preferable to stop the operation of the circuit promptly. An electric power converter of the present invention for driving the magnetron employed in a high frequency heating equipment is thus provided with a voltage detector 52 for detecting changes in voltage of the capacitor 51 which forms the filter with the coil 50 in order to prevent transmission of the high frequency component to the DC power supply 1, a reference voltage source 53, and a comparator 54. The comparator 54 compares the output of the voltage detector 52 and the voltage level of the reference voltage source 53. If the output of the voltage detector 52 is greater, the comparator 54 outputs a stop signal to the driving circuit 7 to stop the operation of the circuit. The comparator 54, for example, may employ just a constant as a reference level instead of the reference voltage source 53 if the voltage of the voltage detector 52 is measured by analog-to-digital conversion, and may compare the value after analog-to-digital conversion with the reference level.

Figure 19A:
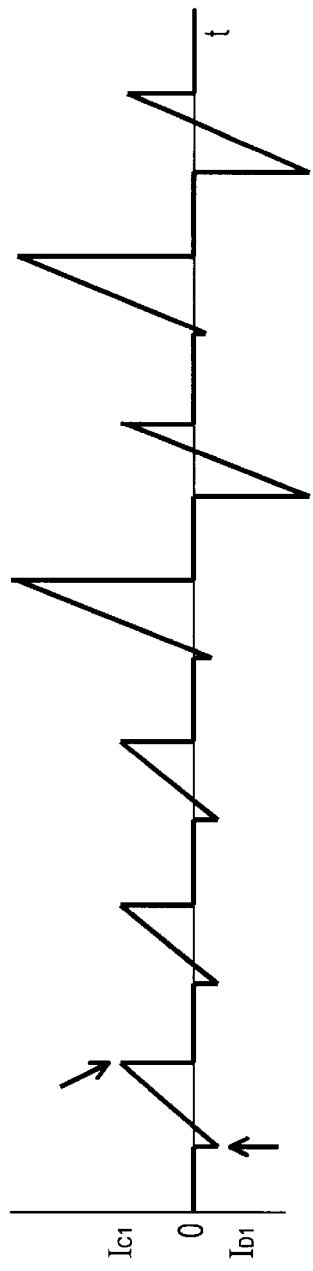
FIGS. 19A to 19D show exemplary waveforms of operation when sparking occurs between the secondary coil terminals of the leakage transformer.
Figure 19B:
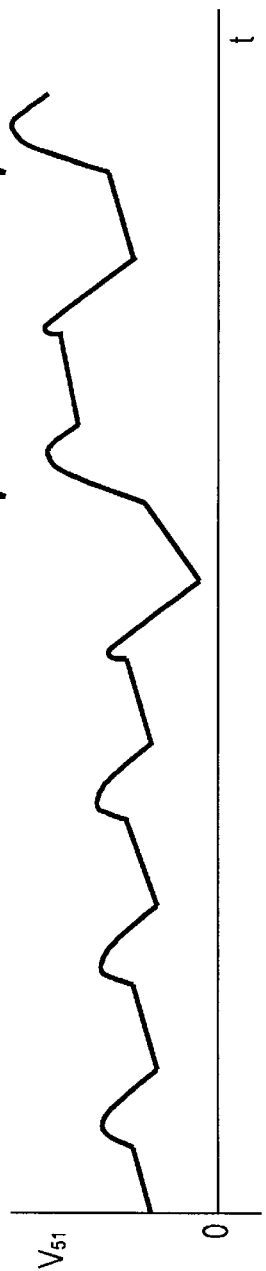
Figure 19C:

If spark occurs between the secondary coil terminals of the leakage transformer, excess current flows when the IGBT 10 of the first semiconductor switching device 3 is turned on because inductance of the leakage transformer reduces. At this point, electric charge is supplied from the capacitor 51 and the voltage of the capacitor 51 suddenly drops by discharging excess electric charge. Next, when the IGBT 10 is turned off, the current in the primary coil of the leakage transformer 2 runs to the capacitor 4, then to the capacitor 5 through the diode 12 of the second semiconductor switching device 6. When energy in the leakage transformer 2 is completely transferred to the capacitor 5, the current starts to run, by contrast, from the capacitor 5 to the leakage transformer through the IGBT 13 which is turned on. If the IGBT 13 is turned off at this point, the current in the leakage transformer 2 travels through the diode 11 of the first semiconductor switching device 3 to the capacitor 51, and voltage of the capacitor 51 suddenly rises. FIG. 19A shows a current waveform $I_{C1}$ of the IGBT 10 of the first semiconductor switching device 3 and a current waveform $I_{D1}$ of the diode at sparking, and FIG. 19B shows a voltage waveform $V_{C51}$ of the capacitor 51. In FIG. 19A, the positive direction of the ordinate shows $I_{C1}$, and the negative direction shows $I_{D1}$. Spark (close to short-circuit) occurs at the point of an arrow. It is apparent that excessive current $I_{C1}$ flows and the voltage $V_{C51}$ suddenly drops. Then the excessive current $I_{D1}$ flows to the diode 11 in the next period to increase $V_{C51}$ suddenly. FIG. 19C shows the output signal of the comparator 54. When $V_{C51}$ increases suddenly and exceeds a certain level, the output signal is transmitted. This signal stops the driving circuit 7.

Voltage $V_{C51}$ may also be detected at the timing when it drops suddenly. In other words, the comparator may be configured to transmit-the signal when the output voltage of the voltage detector 52 becomes smaller than the voltage of the reference voltage source 53.

As mentioned previously, impedance of the coil in the filter of the magnetron is reduced by starting the driving circuit 7 with low frequency. This makes the change of the voltage $V_{C51}$ of the capacitor 51 at start-up larger than during the normal operation. Consequently, a circuit comprising the voltage detector 52, reference voltage source 53, and comparator 54 may activate at start-up and stop the driving circuit 7. To prevent it, the voltage of the reference voltage source 53 is set to higher level at start-up. A transistor of a switching circuit 55 in FIG. 18 is turned off at start-up to set high voltage to the reference voltage source 53, and is turned on during the normal operation to set a lower voltage to the reference voltage source 53.

Voltage of the DC power supply 1 obtained by rectifying the AC power supply may rise when the AC power supply system is struck by lightning surge or by other causes. The voltage in this case may rise several times to several tens of times of the normal voltage. To protect the circuit at such a voltage surge, the operation of the circuit may need to be stopped. To this aim, the voltage detector 52 for detecting voltage changes in the capacitor 51 which forms the filter with the coil 50 to prevent the high frequency component from being transmitted to the DC power supply 1, the reference voltage source 53, and comparator 54 are provided. The comparator 54 compares the output of the voltage detector 52 and the voltage of the reference voltage source 53, and outputs the stop signal to the driving circuit 7 if the output of the voltage detector 52 is greater so that the circuit operation may be stopped. This configuration is capable of detecting excessive voltage caused by rapid voltage rise. Accordingly, the operation may be promptly stopped at occurrence of excessive voltage in the AC power supply system by the use of this configuration. However, it may be necessary to prevent interference of a voltage detection level of the capacitor 51 and a voltage detection level of the AC power supply system during the normal operation. An AC supply voltage detector 56 comprising a series circuit of a diode 57 and a constant voltage device such as Zener diode 58 is thus provided. The AC supply voltage divided by resistance is supplied through the AC supply voltage detector 56 to the voltage detector 52. If the AC supply voltage divided by resistance is less than the sum of the divided voltage of the capacitor 51 input to the voltage detector 52 and the Zener voltage of the Zener diode 58, a signal is not input to the voltage detector 52. Accordingly, the output of the AC supply voltage detector 56 does not affect the voltage detector 52 during the normal operation. Moreover, by providing the diode 57, the voltage detector 52 will not affect the AC supply voltage detector 56. With this configuration, the operation of the circuit may be immediately stopped at occurrence of excessive voltage by lightning surge or sparking. The circuit can also be configured with less components by sharing parts of the circuit.

Tenth Exemplary Embodiment

Figure 19D:
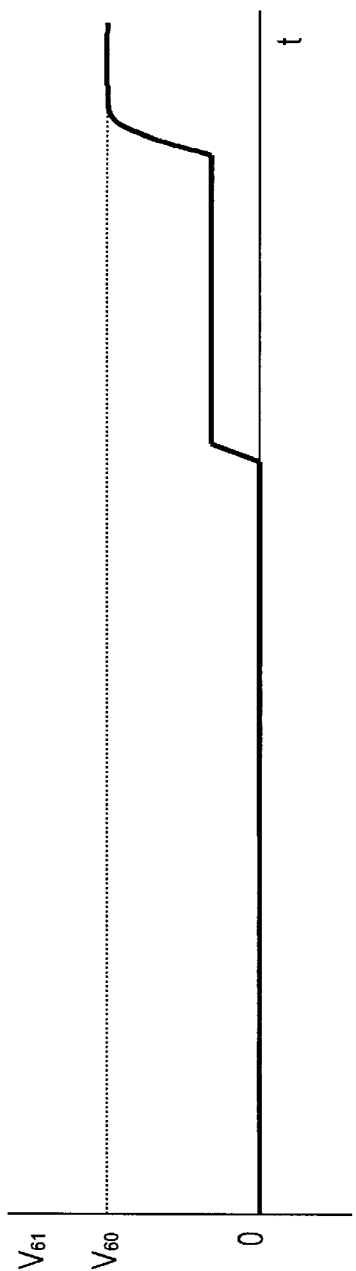
Figure 20:
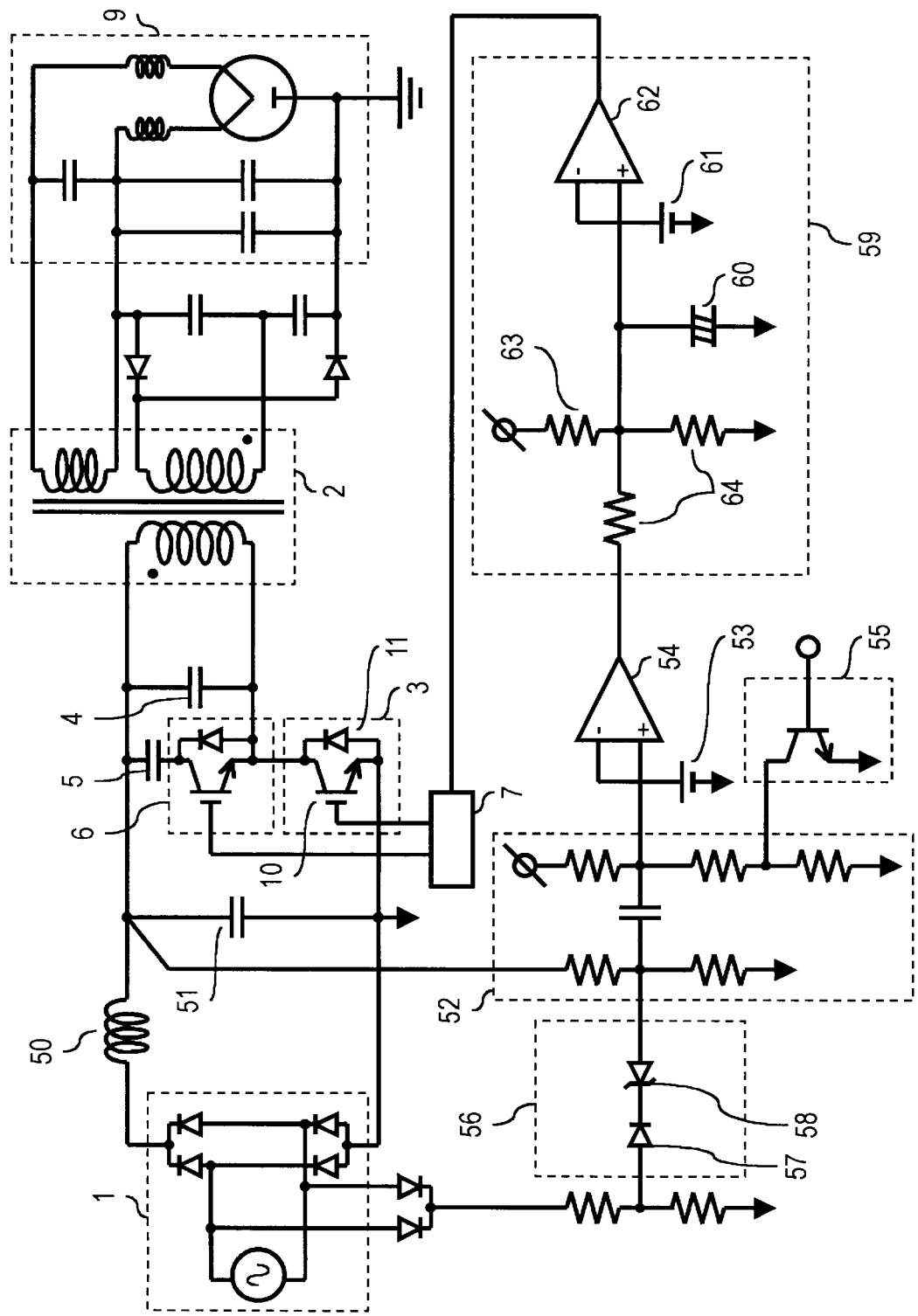
FIG. 20 is a circuit configuration of an electric power converter for driving a magnetron employed in a high frequency heating equipment in accordance with a tenth exemplary embodiment of the present invention.
Figure 21:
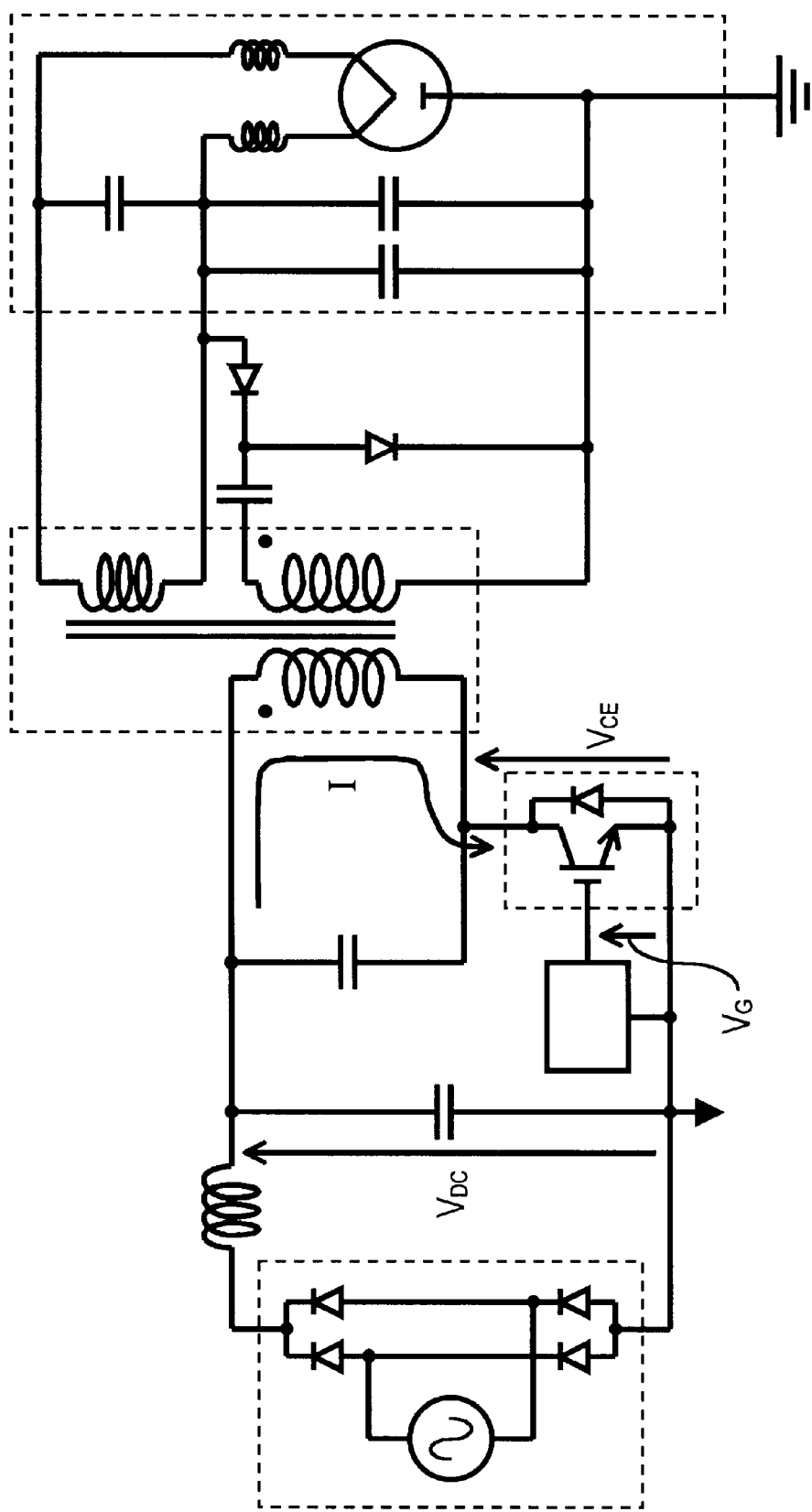
FIG. 21 is a circuit configuration of a power supply for driving the magnetron of a high frequency heating equipment of the prior art.
Figure 22A:
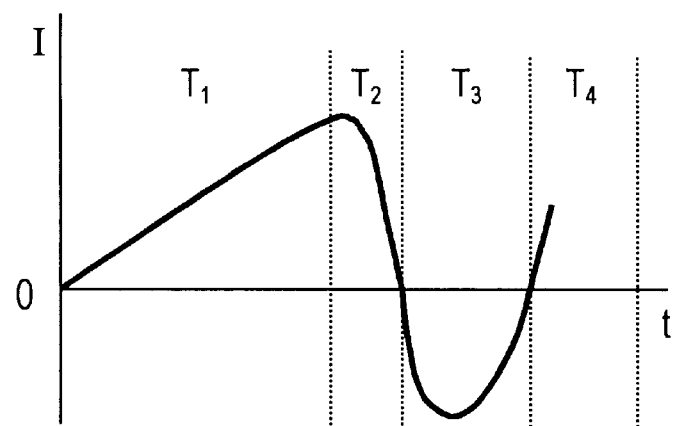
FIGS. 22A to 22D are waveforms for explaining operations of the power supply for driving the magnetron of a high frequency heating equipment of the prior art.
Figure 22B:
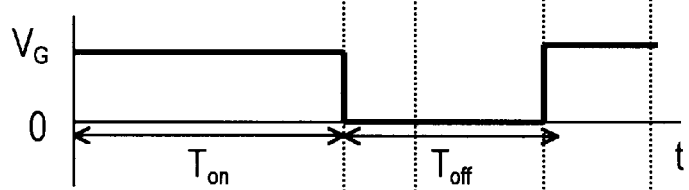
Figure 22C:
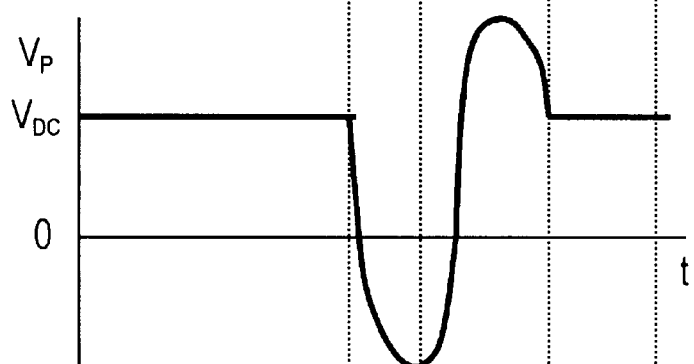
Figure 22D:
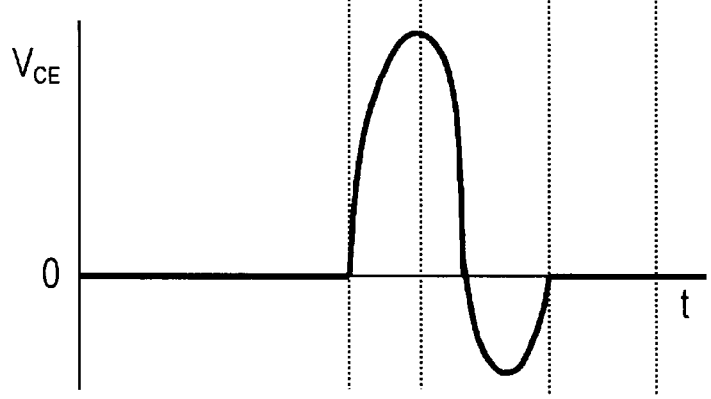
Figure 23:
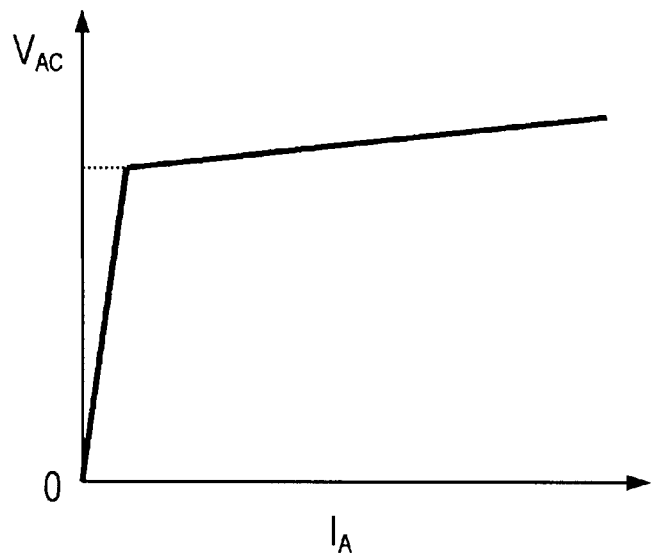
FIG. 23 shows characteristics in the relation of voltage $V_{AC}$ between the anode and cathode of the magnetron and anode current $I_A$.
Figure 24:
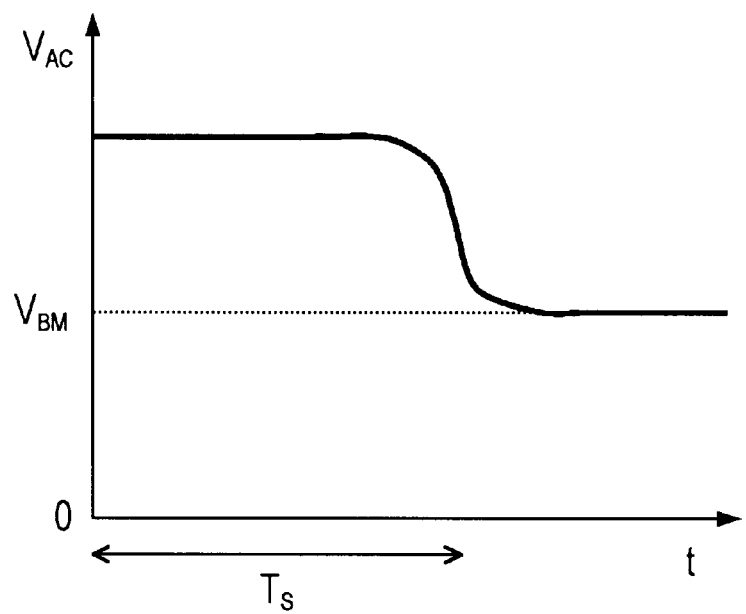
FIG. 24 shows characteristics in a transitional change of the voltage $V_{AC}$ between the anode and cathode by time from start-up to the normal oscillation of the magnetron.

A judgment circuit 59 for stopping the driving circuit 7 in a tenth exemplary embodiment of the present invention is explained with reference to FIG. 20. The judgment circuit 59 for determining stoppage shown in FIG. 20 comprises a capacitor 60 charged by the output of the comparator 54, and a comparator 62 for comparing the voltage of the capacitor 60 and that of the reference voltage source 61. A solid line in a waveform shown in FIG. 19D shows a voltage waveform $V_{60}$ of the capacitor 60, and a dotted line shows a voltage $V_{61}$ of the reference voltage source 61. The capacitor 60 is charged by the output signal of the comparator 54, which is a pulse signal shown in FIG. 19C, and the voltage of the capacitor 60 exceeds the voltage $V_{61}$ of the reference voltage source 61 at the second pulse signal. At this point, the output signal of the comparator 62 is inverted to stop the driving circuit. The judgment circuit 59 determines when to output the stop signal, i.e., after how many times of the output signal from the comparator 54, depending on capacitance of the capacitor 60, the value of a resistance 63 of the current which flows at charging the capacitor 60, or the value of a resistance 64 at discharging the capacitor 60. The purpose of providing such judgment circuit 59 is, for example, to prevent stopping of the function by an instant excessive voltage which does not have a large effect on the circuit operation or external noise. The judgment circuit of the present invention utilizes the characteristic that sparks and lightning surge have a certain continuity, and external noise and instant excessive voltage are more instantaneous without continuity for distinguishing lightning surge and sparking from external noise and instantaneous excessive voltage.

Industrial Applicability

A high frequency heating equipment comprising a DC power supply, a leakage transformer connected to the DC power supply, a first semiconductor switching device connected in series to a primary coil side of the leakage transformer, a first capacitor connected in parallel to the primary coil side of the leakage transformer, a second capacitor, a second semiconductor switching device connected in series with the second capacitor, a driving circuit having an oscillator for driving the first and second semiconductor switching devices, a rectifier connected to the secondary coil side of the leakage transformer for full wave voltage doubler rectification, and a magnetron connected to the rectifier. The OFF time of the first semiconductor switching device 3, or the ON time of the second semiconductor switching device 6, is freely settable by connecting a series circuit of the second capacitor and the second semiconductor switching device to the primary coil side of the leakage transformer in parallel. In addition, voltage of the first semiconductor switching device 3 can be clamped by securing a sufficient capacitance for the second capacitor 5 compared to the first capacitor 4.

With the configuration shown in FIG. 3, emitters of the first semiconductor switching device 3 and the second semiconductor switching device can be set to the same electric potential by connecting a series circuit of the second capacitor 5 and the semiconductor switching device 6 to the primary coil side of the leakage transformer 2 in series. This allows to design a driving circuit with low withstand voltage because the emitter of the second semiconductor switching device 6 is prevented from having high electric potential.

With the configuration shown in FIG. 4, capacitance of the first capacitor 4 can be made smaller for an amount equivalent to the capacitance of the first semiconductor switching device 3 by connecting the first capacitor 4 to the primary coil side of the leakage transformer 2 in series, and further connecting a series circuit of the second capacitor 5 and the second semiconductor switching device 6 to the primary coil of the leakage transformer in parallel.

With the configuration shown in FIG. 5, two effects can be realized. Specifically, capacitance of the first capacitor 4 can be made smaller for an amount equivalent to the capacitance of the first semiconductor switching device 3 and the driving circuit can be designed with lower withstand voltage by connecting the first capacitor 4 to the primary coil side of the leakage transformer 2 in series, and further connecting a series circuit of the second capacitor 5 and the second semiconductor switching device 6 to the primary coil of the leakage transformer in series.

With the configuration shown in FIG. 6 which employs the half wave voltage doubler rectifier system, the configuration shown in FIG. 7 which employs the full wave rectifier system, or the configuration shown in FIG. 8 which employs the center tap system for dividing the secondary coil of the leakage transformer 2 into two parts, efficiency of the use of the leakage transformer can be improved.

Furthermore, the ON and OFF operations of the semiconductor switching device can be implemented under the zero voltage even if the voltage of power supply greatly changes by full wave rectification of the AC power supply to obtain the DC power supply, and providing a frequency Modulator in the driving circuit for modulating the frequency according to a signal emitted based on the voltage of the DC power supply.

Current supplied to the cathode of the magnetron can be increased by providing the frequency modulation switching circuit to switch frequency modulation at start-up and during the normal operation for canceling frequency modulation at start-up to start at a certain frequency.

The frequency modulation switching circuit further comprises a current detector for detecting the current of the diode or capacitor forming the rectifier connected to the secondary coil side of the leakage transformer, and a judgment circuit for determining oscillation of the magnetron based on the output signal of the current detector. This allows to accurately determine the state of the magnetron.

The circuit can also be prevented from operating in the audio frequency bands to avoid occurrence of irritating sound by providing a minimum frequency setting circuit in the frequency modulation switching circuit.

The ON and OFF operations of the semiconductor switching device can be implemented under zero voltage even if voltage of power supply greatly changes by implementing full wave rectification of the AC power supply to obtain the DC power supply and modulating a pulse width of a signal created based on the voltage of the DC power supply.

A change ratio of the cathode current of the magnetron at controlling the output can be kept low by changing the ON time ratio of pulses for driving the first semiconductor switching device to the second semiconductor switching device but keeping the period constant in controlling electric power.

Impedance of the coil provided in the magnetron can be reduced without generating large voltage in the secondary coil of the leakage transformer for supplying sufficient current to the cathode of the magnetron by setting lower operation frequency for starting the operation.

Information on the secondary coil voltage of the leakage transformer at start-up can be indirectly detected by providing a voltage detector for detecting voltage applied to the first semiconductor switching device. By controlling a pulse width of the driving circuit based on this information, the secondary coil voltage of the leakage transformer can be set to a specified value at start-up.

A signal conforming to an envelope of the collector voltage of the first semiconductor switching device having a pulse waveform can be created by forming the voltage detector with a peak hold circuit comprising a transistor, resistor, and capacitor. This signal enables to stably control the pulse width of the driving circuit.

A high frequency heating equipment of the present invention further comprises a DC power supply, a coil connected to the DC power supply, a capacitor connected to the coil, and a voltage detector for detecting changes in the capacitor voltage. The voltage detector consists of a reference voltage source, and a comparator for comparing a detected level of the capacitor voltage and a voltage level of the reference voltage source. The driving circuit is configured to stop when the detected level of the capacitor voltage exceeds or decreases below the voltage level of the reference voltage source. This enables to detect a large change in capacitor voltage by occurrence of sparking at a high-voltage portion in the secondary coil side of the leakage transformer, allowing to prevent continuous sparking by stopping the operation of the driving circuit.

A voltage change of the capacitor at starting and a voltage change of the capacitor by occurrence of sparking can be distinguished by providing a switching circuit for switching a reference voltage source between at start-up and during the normal operation.

The present invention further comprises the DC power supply which is obtained by full wave rectification of the AC power supply and an AC power supply voltage detector for detecting voltage of the AC power supply. The AC power supply voltage detector comprises a series circuit of a diode and Zener diode, and receives the output signal of the AC supply voltage. This enables to detect abnormal voltage surge by lightning which may occur in the AC power supply system, and also offers a more simple circuit configuration by sharing a part of the circuit.

The present invention further comprises a judgment circuit for determining when to output the stop signal to the driving circuit based on the number of times when the detected level of the capacitor voltage exceeds or decreases below the voltage level of the reference voltage source. This enables to distinguish between instantaneous excessive voltage due to external noise and lightning surge or sparking.

What is claimed is:

1. A high frequency heating apparatus for use with a power supply which is a DC power supply provided by a rectified AC power supply, said frequency heating apparatus further comprising:

a leakage transformer connected to said DC power supply;

a first switching device connected in series to a primary coil side of said leakage transformer;

a first capacitor connected to said first switching device;

a series circuit of a second capacitor and a second switching device, the latter being a semiconductor switching device;

driving means for driving said first switching device and said second semiconductor switching device alternately;

frequency modulation means for modulating a frequency according to a signal generated based on voltage of said power supply provided to said driving means;

rectification means connected to a secondary coil side of said leakage transformer; and a magnetron connected to said rectification means, wherein said first capacitor, said second capacitor and said leakage transformer form a resonant circuit.

2. A high frequency heating apparatus as defined in claim 1, wherein said rectification means connected to the secondary coil side of said leakage transformer provides one of:

1) full wave voltage doubler rectification;
   2) half wave voltage doubler rectification;
   3) full wave rectification; and
   4) center tapping for tapping the secondary coil of said leakage transformer at the center and connecting to the magnetron via a diode.

3. A high frequency heating apparatus as defined in claim 1 further comprising frequency modulation switching means for switching said frequency modulation means so as to start operation at a fixed frequency.

4. A high frequency heating apparatus as defined in claim 3, wherein said rectification means includes a diode and capacitor connected to the secondary coil side of said leakage transformer, and said frequency modulation switching means comprises:

current detection means for detecting current of at least one of the diode and capacitor forming said rectification means; and judgment means for determining oscillation of the magnetron based on said current detection means and the output signal of said current detection means.

5. A high frequency heating apparatus as defined in claim 4, wherein said frequency modulation switching means comprises minimum frequency setting means.

6. A high frequency heating apparatus as defined in claim 1, wherein said power supply is a rectified AC power supply, and said high frequency heating equipment further comprises pulse width modulation means for modulating a pulse width according to a signal generated based on voltage of said power supply.

7. A high frequency heating apparatus as defined in claim 1, wherein power is controlled by changing an ON time ratio of pulses for driving said first switching device to said second switching device, and keeping a period constant.

8. A high frequency heating apparatus as defined in claim 1, said leakage transformer further comprising a tertiary coil for supplying current to a cathode of the magnetron, said cathode of the magnetron having a filter comprising a capacitor and coil; and said driving means further comprising starting frequency setting means for setting frequency to a level which reduces impedance of said coil.

9. A high frequency heating apparatus as defined in claim 1, said driving means further comprising voltage detection means for detecting voltage applied to said first switching device, and said voltage detection means controlling a pulse width.

10. A high frequency heating apparatus as defined in claim 9, said voltage detection means having peak hold means comprising a transistor, resistor, and capacitor.

11. A high frequency heating apparatus as defined in claim 1, said driving means comprising a coil connected to said power supply, a capacitor connected to said coil, voltage detection means for detecting changes in voltage of said capacitor, reference voltage setting means, and comparison means for comparing a detected level of voltage of said capacitor and a reference level of said voltage setting means.

12. A high frequency heating apparatus as defined in claim 11, further comprising switching means for switching the reference level between at start-up and during normal operation.

13. A high frequency heating apparatus as defined in claim 11, wherein said power supply is a rectified AC power supply, and said high frequency heating equipment further comprises AC supply voltage detection means for detecting voltage of said AC power supply, said AC supply voltage detection means comprising a series circuit of a diode and constant voltage device, and the output signal of said AC supply voltage detection means being input to said voltage detection means.

14. A high frequency heating apparatus as defined in claim 11, further comprising stop judgment means for outputting a stop signal to said driving means based on the number of times that the detected level of voltage of said capacitor exceeds the reference level.

15. A heating apparatus as defined in claim 1 wherein said first capacitor and said series circuit of the second capacitor and the second switching device are configured so that said first capacitor is connected in parallel to the primary coil side of said leakage transformer and said series circuit of the second capacitor and the second switching device is connected in parallel to the primary coil side of said leakage transformer.

16. A heating apparatus as defined in claim 1, wherein said first capacitor and said series circuit of the second capacitor and the second switching device are configured so that said first capacitor is connected in parallel to the primary coil side of said leakage transformer and said series circuit of the second capacitor and the second switching device is connected in parallel to said first switching device.

17. A heating apparatus as defined in claim 1, wherein said first capacitor and said series circuit of the second capacitor and the second switching device are configured so that said first capacitor is connected in parallel to said first switching device and said series circuit of the second capacitor and the second switching device is connected in parallel to the primary coil side of said leakage transformer.

18. A heating apparatus as defined in claim 1, wherein said first capacitor and said series circuit of the second capacitor and the second switching device are configured so that said series circuit of the second capacitor and the second switching device and said first capacitor are connected in parallel to said first switching device.

19. A heating apparatus as defined in claim 1, wherein said first capacitor is connected to said leakage transformer.

* * * * *